(12) United States Patent
Takahashi

(10) Patent No.: US 9,013,647 B2
(45) Date of Patent: Apr. 21, 2015

(54) STEREOSCOPIC IMAGE DISPLAY DEVICE COMPRISING A GRADIENT-REFRACTIVE-INDEX LIQUID-CRYSTAL LENS HAVING A PLURALITY OF ELECTRODE GROUPS

(71) Applicant: NLT Technologies, Ltd., Kawasaki, Kanagawa (JP)

(72) Inventor: Sounosuke Takahashi, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 16 days.

(21) Appl. No.: 14/096,971

(22) Filed: Dec. 4, 2013

(65) Prior Publication Data

US 2014/0152926 A1 Jun. 5, 2014

(30) Foreign Application Priority Data

Dec. 5, 2012 (JP) ................................. 2012-265940

(51) Int. Cl.
*G02F 1/1335* (2006.01)
*G02F 1/13* (2006.01)
(Continued)

(52) U.S. Cl.
CPC ........ *G02B 27/2214* (2013.01); *G02F 1/13306* (2013.01); *G02B 27/26* (2013.01); *G02B 27/0093* (2013.01)

(58) Field of Classification Search
CPC ............... G02B 27/26; H04N 13/0404; G02F 1/134309
USPC .................................................... 349/15, 200
See application file for complete search history.

(56) References Cited

U.S. PATENT DOCUMENTS

| 2004/0169919 A1 | 9/2004 | Uehara et al. |
| 2011/0084963 A1 | 4/2011 | Im |

(Continued)

FOREIGN PATENT DOCUMENTS

| JP | 07-38926 A | 2/1995 |
| JP | 10-221703 A | 8/1998 |

(Continued)

OTHER PUBLICATIONS

Jian-Gang Lu et al., "2D/3-D Switchable Display by Fresnel-Type LC Lens", Journal of Display Technology, Apr. 2011, pp. 215-219, vol. 7, No. 4.

(Continued)

*Primary Examiner* — Paul Lee
(74) *Attorney, Agent, or Firm* — Sughrue Mion, PLLC

(57) ABSTRACT

A stereoscopic image display device includes an image display unit including plural unit pixels each including pixels for left and right viewing fields; a gradient-refractive-index liquid-crystal lens; and a liquid-crystal lens drive circuit. The liquid-crystal lens includes a liquid-crystal cell, plural electrode groups each including plural stripe-shaped transparent electrodes corresponding to a column of the unit pixels, and a counter transparent electrode having a constant potential. The liquid-crystal lens drive circuit is configured to apply voltages to the transparent electrodes with forming a common voltage pattern for each of the electrode groups so as to make liquid crystal of the liquid-crystal cell work as plural lenses forming a predetermined refractive-index profile for each of the electrode groups, and is configured to shift the voltage pattern according to information of a viewpoint position of an observer so as to shift the refractive-index profile of each of the lenses.

18 Claims, 28 Drawing Sheets

(51) Int. Cl.
  *G02B 27/22* (2006.01)
  *G02F 1/133* (2006.01)
  *G02B 27/26* (2006.01)
  *G02B 27/00* (2006.01)

(56) References Cited

U.S. PATENT DOCUMENTS

2012/0307169 A1* 12/2012 Ohyama et al. ............ 349/33
2012/0320288 A1* 12/2012 Baek et al. .................. 349/5

FOREIGN PATENT DOCUMENTS

| JP | 2002-328333 A | 11/2002 |
|---|---|---|
| JP | 2004-258631 A | 9/2004 |
| JP | 2004-280052 A | 10/2004 |
| JP | 2005-175973 A | 6/2005 |
| JP | 2005-223727 A | 8/2005 |
| JP | 2006-126721 A | 5/2006 |
| JP | 3814366 A | 8/2006 |
| JP | 3940725 B2 | 7/2007 |
| JP | 2009-104137 A | 5/2009 |
| JP | 4400172 B2 | 1/2010 |
| JP | 2010-56712 A | 3/2010 |
| JP | 4495982 B2 | 7/2010 |
| JP | 4687073 B2 | 5/2011 |

OTHER PUBLICATIONS

Toshiaki Nose et al., "Improvement of Optical Properties and Beam Steering Functions in a Liquid Crystal Microlens with an Extra Controlling Electrode by a Planar Structure", The Japan J. of Appl. Phys., Nov. 2000, pp. 6383-6387, vol. 39, No. 11.

Shin Masuda et al., "Liquid-crystal microlens with a beam-steering function", Applied Optics, Jul. 1997, pp. 4772-4778, vol. 36, No. 20.

Susumu Sato, "Liquid-Crystal Lens-Cells with Variable Focal Length", Japanese Journal of Applied Physics, Sep. 1979, pp. 1679-1684, vol. 18, No. 9.

* cited by examiner

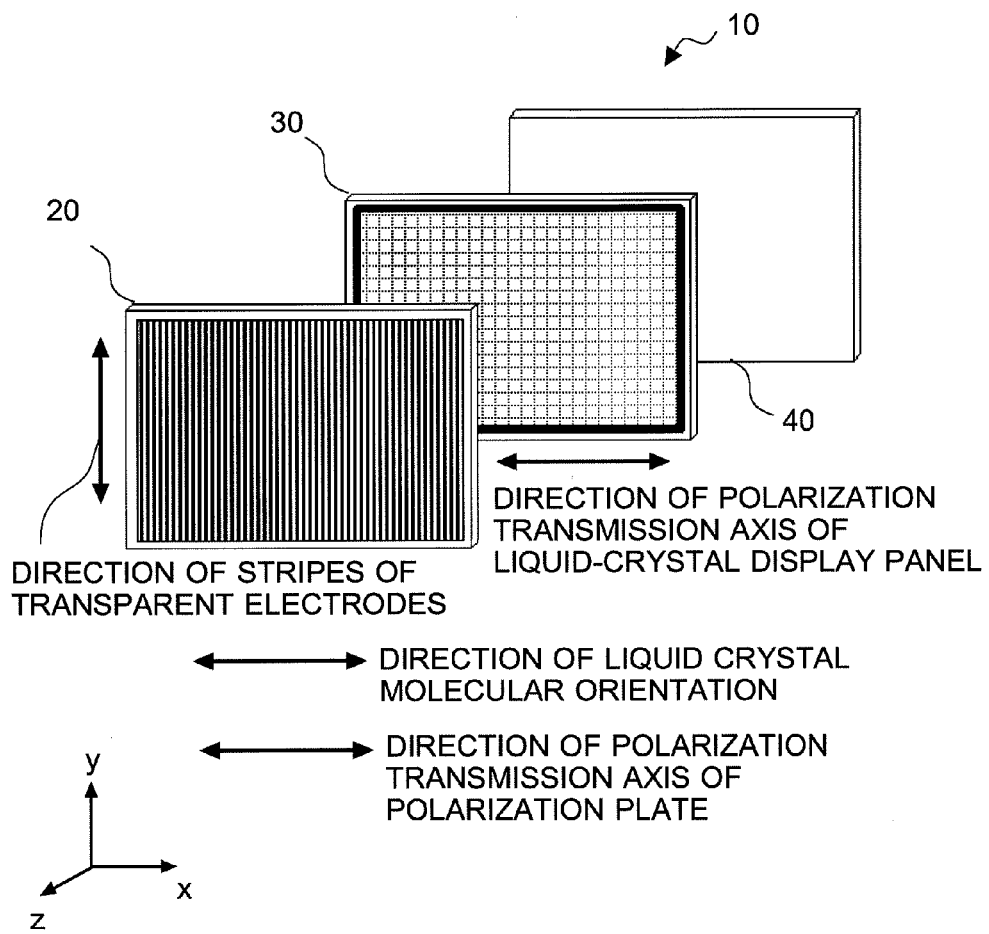

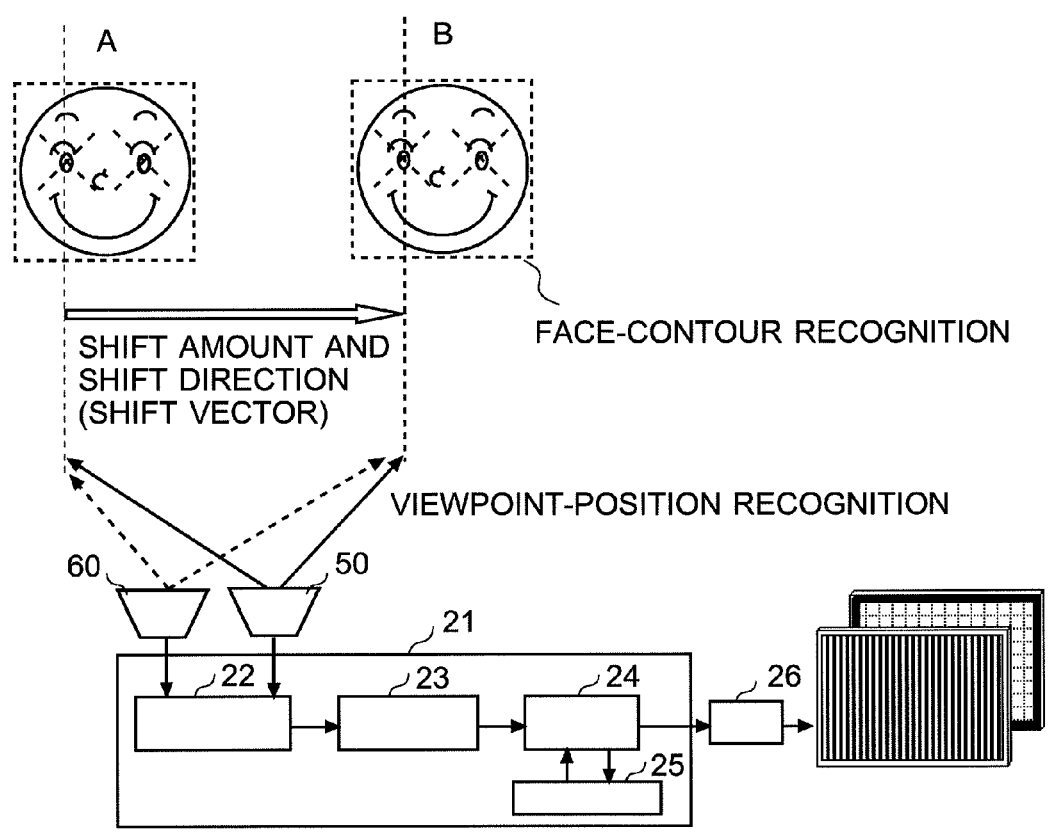

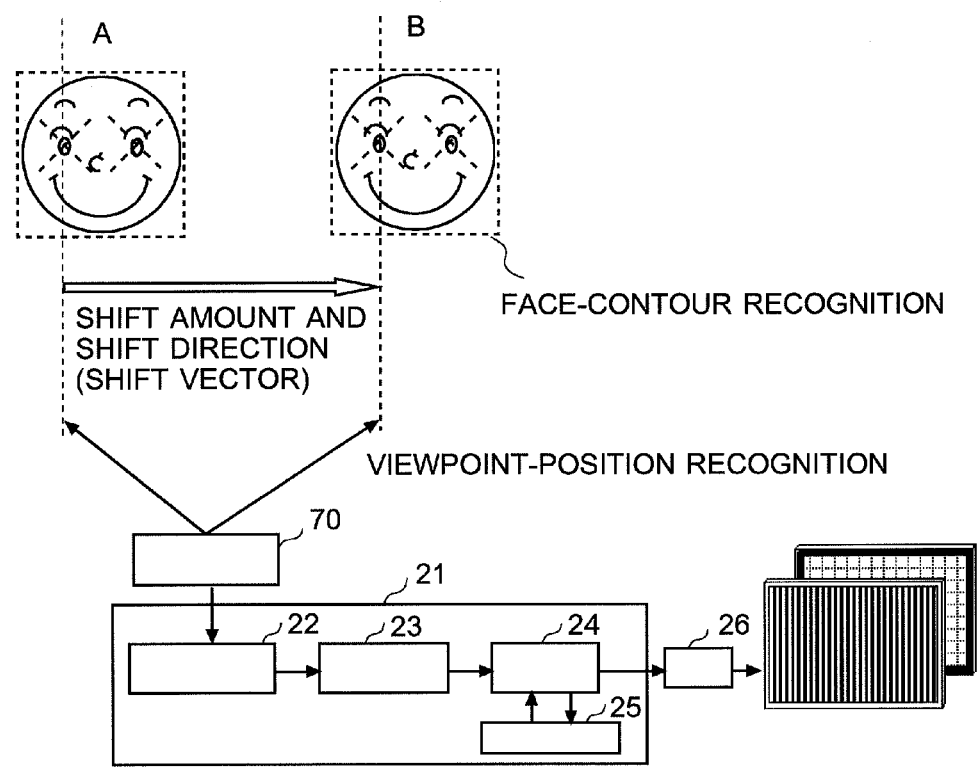

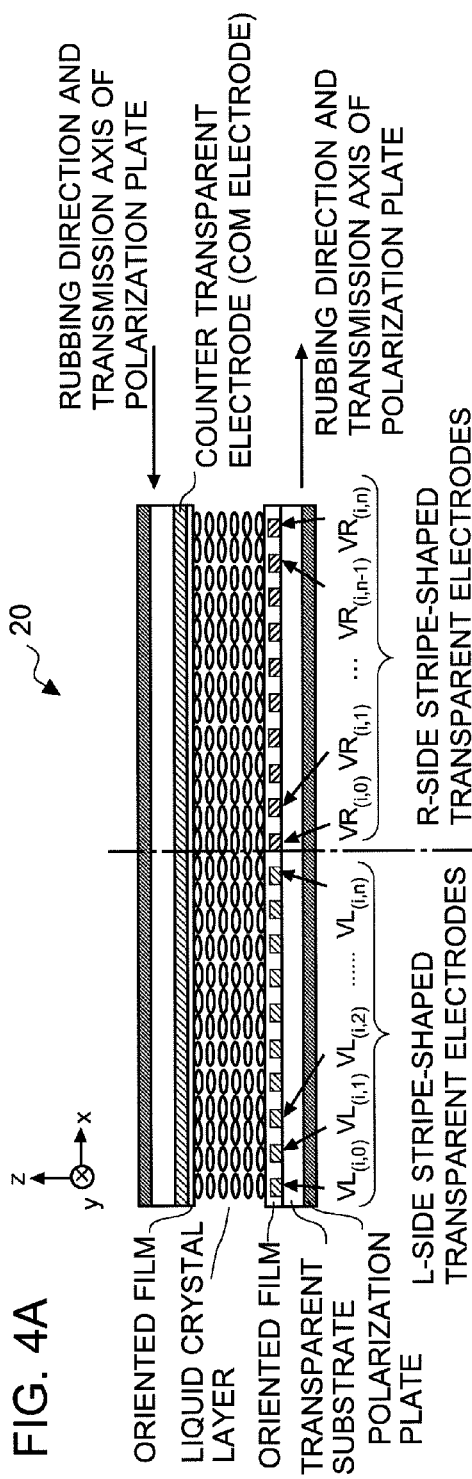
FIG. 4A
FIG. 4B
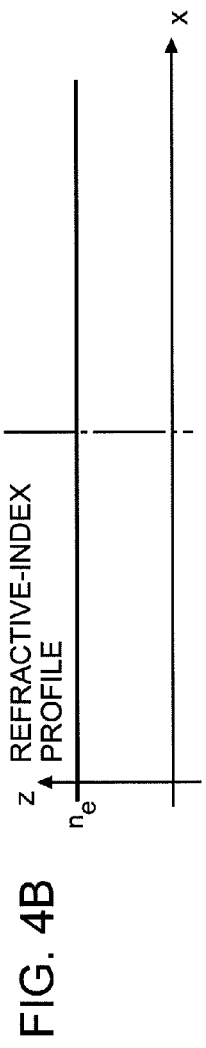
FIG. 4C
| EX. | VL, VR STRIPE-SHAPED ELECTRODES | | V(i,0) | V(i,1) | V(i,2) | ... | V(i,n-2) | V(i,n-1) | V(i,n) |
|---|---|---|---|---|---|---|---|---|---|
| 1-1 | APPLIED VOLTAGE[V] FOR n=10 (LENS OFF, 2D) | VL | 0 | 0 | 0 | ... | 0 | 0 | 0 |
| | | VR | 0 | 0 | 0 | ... | 0 | 0 | 0 |

| EX. | VL, VR STRIPE-SHAPED ELECTRODES | | V(i,0) | V(i,1) | V(i,2) | ... | V(i,n-2) | V(i,n-1) | V(i,n) |
|---|---|---|---|---|---|---|---|---|---|
| 1-2 | APPLIED VOLTAGE[V] FOR n=10 (LENS ON, 3D) | VL | 10 | 9 | 8 | ... | 2 | 1 | 0 |
| | | VR | 0 | 1 | 2 | ... | 8 | 9 | 10 |

| EX. | VL, VR STRIPE-SHAPED ELECTRODES | | V(i,0) | V(i,1) | V(i,2) | ... | V(i,n-2) | V(i,n-1) | V(i,n) |
|---|---|---|---|---|---|---|---|---|---|
| 1-3 | APPLIED VOLTAGE[V] FOR n=10 (AFTER LENS SHIFT) | VL | 9 | 10 | 10 | ... | 4 | 3 | 2 |
| | | VR | 1 | 0 | 0 | ... | 6 | 7 | 8 |

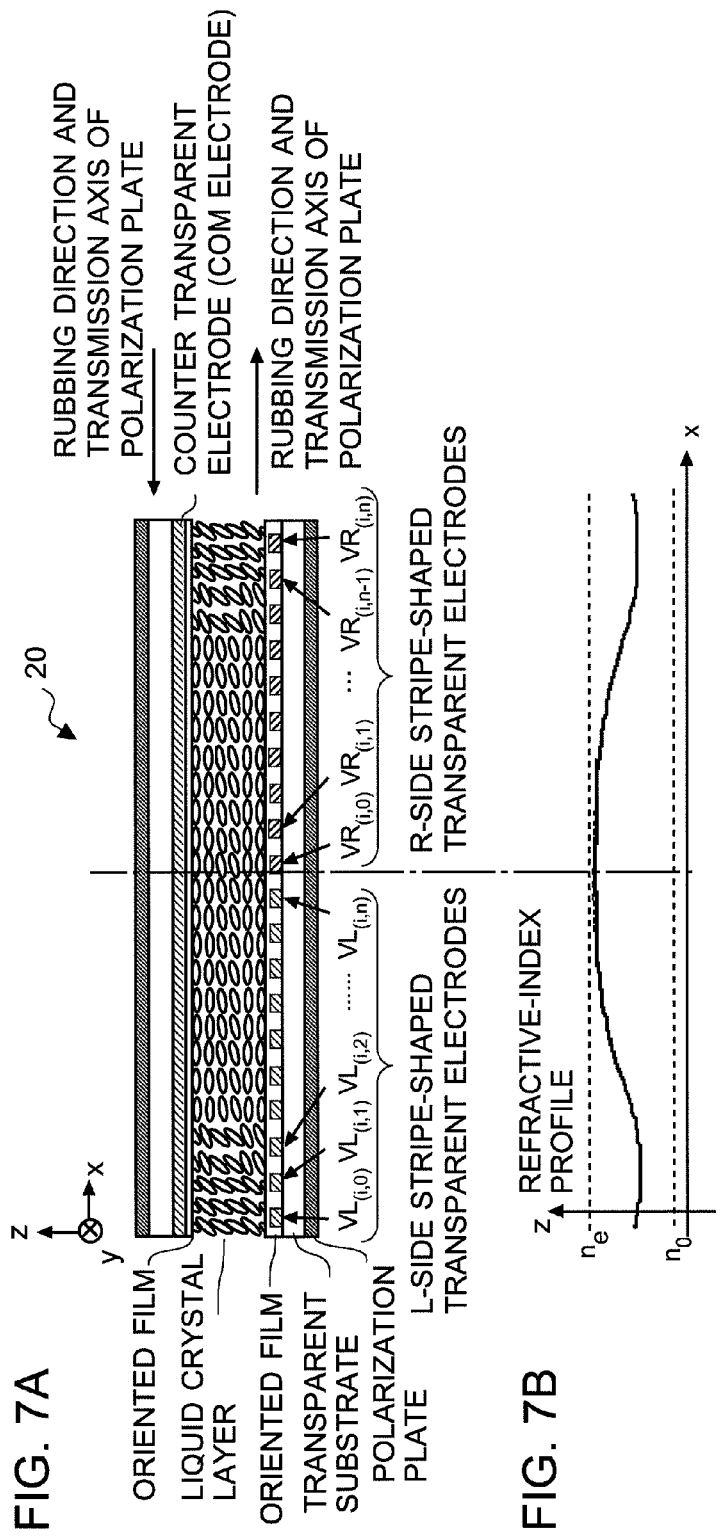

FIG. 7D

| APPLIED VOLTAGE[V] | VL0 | VL1 | VL2 | VL3 | VL4 | VL5 | VL6 | VL7 | VL8 | VL9 | VL 10 | VR0 | VR1 | VR2 | VR3 | VR4 | VR5 | VR6 | VR7 | VR8 | VR9 | VR 10 |
|---|---|---|---|---|---|---|---|---|---|---|---|---|---|---|---|---|---|---|---|---|---|---|
| INITIAL STATE | 10 | 9 | 8 | 7 | 6 | 5 | 4 | 3 | 2 | 1 | 0 | 0 | 1 | 2 | 3 | 4 | 5 | 6 | 7 | 8 | 9 | 10 |
| SHIFT LENS CENTER | 7 | 8 | 9 | 10 | 10 | 9 | 8 | 7 | 6 | 5 | 4 | 3 | 2 | 1 | 0 | 0 | 1 | 2 | 3 | 4 | 5 | 6 |

INITIAL LENS CENTER ⇨ SHIFTED LENS CENTER

DISPLAY AREA
(STRIPE-SHAPED
TRANSPARENT ELECTRODES)

| EX. | VL, VR STRIPE-SHAPED ELECTRODES | | V(i,0) | V(i,1) | V(i,2) | ... | V(i,n-2) | V(i,n-1) | V(i,n) |
|---|---|---|---|---|---|---|---|---|---|
| 1-2 | APPLIED VOLTAGE[V] FOR n=10 (LENS ON, 3D) | VL | 10 | 9 | 8 | ... | 2 | 1 | 0 |
| | | VR | 0 | 1 | 2 | ... | 8 | 9 | 10 |

METAL WIRES — DISPLAY AREA (STRIPE-SHAPED TRANSPARENT ELECTRODES)

DISPLAY AREA
(STRIPE-SHAPED
TRANSPARENT ELECTRODES)

STRIPE-SHAPED
TRANSPARENT ELECTRODE    ORIENTED FILM

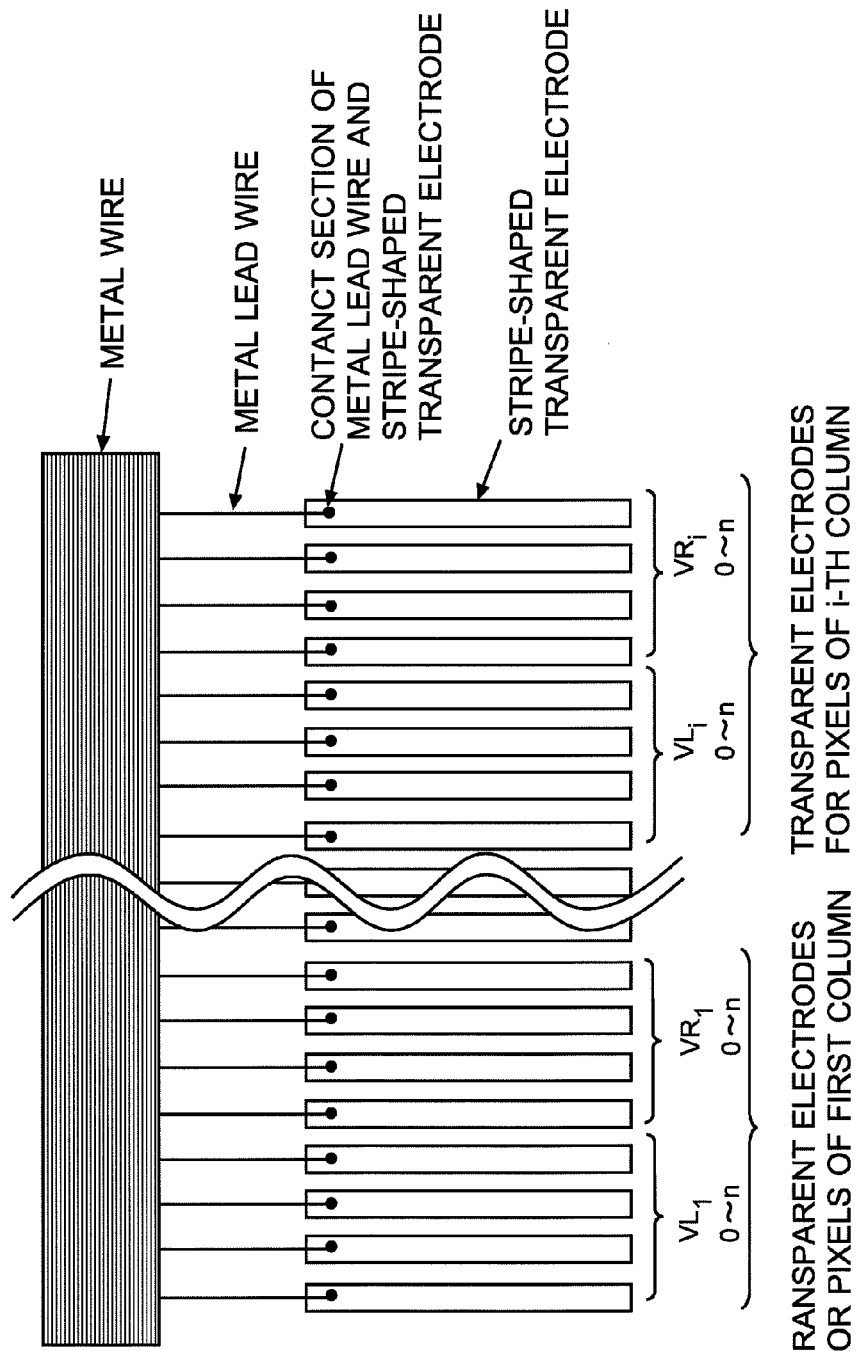

STEREOSCOPIC IMAGE DISPLAY DEVICE COMPRISING A GRADIENT-REFRACTIVE-INDEX LIQUID-CRYSTAL LENS HAVING A PLURALITY OF ELECTRODE GROUPS

TECHNICAL FIELD

The present invention relates to a stereoscopic image display device employing a liquid-crystal lens, and especially to a stereoscopic image display device employing a gradient-refractive-index liquid-crystal lens based on an electro-optic effect.

BACKGROUND

As a technique to make an observer to perceive a stereoscopic image, a stereoscopic image displaying method based on a binocular disparity, wherein the position difference of the left and right eyes of the observer is used to good advantage, is generally used. This method is an application of the principle used for a stereogram which makes the left and right eyes of an observer separately perceive different two-dimensional images so as to make the observer's brain recognize a three-dimensional image based on the difference of the perceived images. As such the stereoscopic image displaying method, there are known a stereoscopic viewing method using glasses and a stereoscopic viewing method with naked eyes, using no glasses. The stereoscopic viewing method with naked eyes includes a multi-viewpoint type and a two-viewpoint type, depending on the number of viewpoints of an observer.

To represent a stereoscopic image through the naked-eye method by using a two-dimensional image displaying device such as a normal flat-panel display device, there is used a method to spatially separate images for left and right eyes displayed on a two-dimensional screen and present the images to the left and right eyes separately, by using one of a parallax-barrier method wherein a light-shielding structure (barrier) formed by slits is arranged between a display panel and a light source, and a lens method wherein lenticular lenses are arranged between the observer and a display panel for displaying two-dimensional images.

On the other hand, in many of those stereoscopic viewing methods with naked eyes, the barrier or the lenses are fixedly joined to a display panel, which restricts a stereoscopic perceptive region into a narrower area. Further, in a situation where the number of viewpoints is increased so as to widen the stereoscopic perceptive region in the multi-viewpoint method, it is required to display an increased number of images on the display panel according to the number of viewpoints, which causes deterioration in resolution of each image. When an observer moves under the condition that the stereoscopic perceptive region is restricted to a narrow area, the viewpoint of the observer easily goes out from the stereoscopic perceptive region and easily enters in a pseudoscopic region in which the observer perceives the images for left and right eyes inversely. In this situation, the observer hardly perceives stereoscopic images.

In view of the above matter, Japanese Unexamined Patent Application Publications (JP-A) Nos. 1107-38926 and 2005-175973 disclose a head-detecting device for detecting a spatial position of the head of an observer, and a servo mechanism configured to mechanically move a lenticular lens composed of arrayed cylindrical lenses or a light-shielding structure serving a barrier to be synchronized with the output of the head-detecting device, so as to shift the stereoscopic perceptive region with following the viewpoint of the observer. Further, Japanese Patent (JP-B) No. 4495982 (JP-A No. 2005-223727) discloses a technology to display plural images through a time divisional method, to drive a polarization switching element formed of liquid crystal to be synchronized with the displayed images, and further to use both of a barrier and lenses, for a purpose of achieving an increase of viewpoints of a display device with a smaller number of pixels.

Further, in a field of stereoscopic image display devices, there is a strong demand to achieve a two-dimensional (2D) display for mainly representing letters and characters and a three-dimensional (3D) display for mainly representing objects and landscapes on one screen in a mingling manner. As a method to switch the display mode of one pixel between 2D and 3D, there have been proposed a lenticular-lens method using an array of sub-pixels elaborated with the demand considered in JP-B No. 4400172 (JP-A No. 2004-280052) and a liquid-crystal lens method by which the lens properties can be turned on/off in JP-A No. 2009-104137 and JP-B Nos. 4687073 and 3940725 (JP-A Nos. 2006-0126721 and 2004-258631).

Regarding the lenticular-lens method, assuming that the extending direction of the ridgelines of the lenticular lens is the vertical direction, the vertical pitch and the horizontal pitch of each pixel are the same and sub-pixels for R, G and B colors are arranged in vertical stripes in parallel with the extending direction of the lenticular lens, in conventional arts. Therefore, in the conventional arts, the horizontal resolution has been required to be doubled in order to secure the 3D resolution to be equivalent to the 2D resolution. JP-B No. 4400172 discloses a structure that the horizontal pitch of each pixel is set to half of the vertical pitch and sub-pixels for R, G and B colors are arranged in horizontal stripes perpendicular to the extending direction of the lenticular lens, which achieves a display wherein 2D display and 3D display mingle together, with securing the 2D and 3D resolutions at the same level.

Regarding the liquid-crystal lens method, a liquid-crystal lens is a kind of optical element which takes advantage of physical properties of liquid crystal materials, such as an electro-optical effect and a great anisotropy in refractive index, and which is employed to make the best use of its advantages that a low drive voltage, low power consumption, and two-dimensional arrangement of the elements can be easily achieved (please see the following non-patent literatures: S. Sato, Jpn. J. Appl. Phys., Vol. 18, No. 9 pp. 1679-1684, 1979; Matsuda et al., Appl. Opt., Vol. 36, No. 20, pp. 4772-4778, 1997; Nose et al., Jpn. J. Appl. Phys., Vol. 39, No. 11, pp. 6383-6387, 2000; and Lu et al., J. Display Technol., Vol. 7, No. 4, pp. 215-219, 2011). For example, a variable-focus liquid-crystal lens is achieved by preparing a liquid-crystal cell which employs an electrode substrate with a surface in a lens shape, and applying a voltage to the liquid-crystal cell so as to change the refractive index of the liquid crystal in the polarization direction of incident light from "ne" to "no".

Further, a liquid-crystal micro-lens is composed of a liquid-crystal cell which includes two flat substrates on which a slit-patterned electrode or a circular-hole-patterned electrode is arranged and includes liquid crystal sealed between the substrates. When a voltage is applied to the electrode, a non-uniform electric field in axial symmetry is generated in a slit-patterned or circular-hole-patterned opening where the electrode does not present. Molecules of liquid crystal are oriented along the generated electric field again, and the refractive-index profile of the liquid crystal has a shape of the binominal profile in which the refractive index continuously changes from "ne" to "no" in the area from the center of the opening to the patterned-edge section. This refractive-index profile causes optical-path difference Δnd and provides a lens effect. In other words, a variable-focus GRIN lens is provided.

Such a liquid-crystal lens can be formed to have a refractive-index profile which has a shape of the almost ideal binomial profile, which provides excellent lens properties. By using divided electrodes and/or an externally-controlled electrode structure, the refractive-index profile can be shifted parallel along the plane of the liquid-crystal cell, in other words, the lens position can be shifted, by about 10 μm (hereinafter, μm is also represented as "um"), with securing the lens properties (see, the above-described non-patent literatures: Matsuda et al. and Nose et al.). However, the opening which presents lens properties has been fixed by the initial electrode arrangement, and a shift of the lens can cause a lack of a part of the lens. Therefore, this structure hardly provides the shift amount of the lens as large as a few hundred micrometers by which the lens can perform a viewpoint tracking.

Further, the liquid-crystal lens requires a sufficient optical-path length, which makes the cell gap "d" larger than the cell gap of a general liquid-crystal display panel, in order to increase the retardation (Δnd) of the liquid-crystal lens. Thereby, the response of the liquid-crystal lens becomes relatively slow. This matter can be enhanced if liquid crystal with sufficiently-great anisotropic refractive index Δn is available. However, the anisotropic refractive index Δn of currently available liquid crystal is about 0.2 at most, which makes the enhancement difficult. In view of that, the liquid-crystal lens disclosed in Lu et al. has a refractive-index profile in a form of a Fresnel lens, to achieve a reduction of the cell gap.

JP-A No. 2009-104137 discloses the following stereoscopic image display device. Under the situation that a liquid-crystal lens is used in place of a lenticular lens in a stereoscopic image display device, the liquid-crystal lens is required to have a refractive-index profile equivalent to that of arrayed cylindrical lenses. In the stereoscopic image display device, the widths and intervals of the electrodes are changed in order to obtain excellent liquid-crystal lens properties also in a space between neighboring lenses, in other words, around the edge parts of the liquid-crystal lens under the above situation.

JP-B No. 4687073 (JP-A No. 2006-126721) discloses the following liquid-crystal lens in order to adjust the refractive-index profile for each pixel independently. In the liquid-crystal lens, gaps and widths of strip-shaped electrodes are changed gradually in one direction so as to make an electric field gradient, thereby, the liquid-crystal lens has a prism-shaped refractive-index profile. In each pixel, a constant drive voltage is applied to stripe-shaped electrodes and the counter electrode serves as a common electrode.

JP-B No. 3940725 (JP-A No. 2004-258631) discloses a technique to use a liquid-crystal lens in place of a lenticular lens, and a phase modulation unit (composed of a half-wavelength plate and a ferroelectric-liquid-crystal cell) configured to rotate a polarization plane for switching the display mode between 2D and 3D, so that the 2D/3D display modes can be switched quickly by using the phase modulation unit rather than the on/off switching of the liquid-crystal lens.

JP-B No. 3814366 (JP-A No. H10-221703) discloses a way to provide liquid-crystal lenses formed by the following method in order to control the liquid-crystal lenses individually for each pixel. There is provided a high-resistant thin-film resistance wire with joined to low-resistant stripe-shaped electrodes (transparent electrodes made of metal or low-resistant ITO (Indium Tin Oxide)) so as to tie up the low-resistant stripe-shaped electrodes. Different voltages are applied to the both ends of the high-resistant thin-film resistance wire to form a gradient electric-field distribution and provide a liquid-crystal lens. By joining the stripe-shaped electrodes together with the thin-film resistance wire and applying different voltages to the respective stripe-shaped electrodes, the number of output voltage values is restricted and cost of the driver is reduced.

JP-A No. 2010-56712 proposes the following method to maintain a stereoscopic view. It is assumed that the optical axis going through a panel plane of a stereoscopic image display panel (a plane including the z-y axes) perpendicularly is defined as the x-axis. There is provided an image separating element (such as a lenticular lens, a parallax barrier and a liquid-crystal lens) for spatially separating an image for the right eye and an image for the left eye. Even when a posture of a user who is observing the panel changes so as to be rotated in the O-direction within the panel plane, the image separating element is rotated according to a detection result, to maintain a stereoscopic view.

JP-A No. 2002-328333 discloses the following display device using an optical wavefront control. In the display device, plural microscopic liquid-crystal cells are arrayed in matrix and are separately controlled to obtain a binocular disparity. The JP-A No. 2002-328333 further discloses, as another structure to control liquid crystal by using just an electrode structure in place of the structure to control liquid crystal as the individual cells, a simple matrix structure that electrodes formed on opposite substrates are arranged to cross each other (see paragraph 0061 of the document).

However, in the above-described conventional arts, the structures of JP-A Nos. H07-38926 and 2005-175973 require a servo mechanism configured to move a lens and a space required for moving the lens, for a purpose of the viewpoint tracking, which causes a problem that the device becomes greater in size.

The technique disclosed in the JP-B No. 4495982 is a technique just for achieving multiple viewpoints, which lacks a function to tracking a viewpoint and is required to be coupled with a lenticular lens. Further, as for a liquid-crystal cell having a wedge-shaped surface, its surface processing is difficult, as can be seen from the description of the document: "it is difficult to sharpen the apex of the saw tooth formed on the saw-tooth substrate, and in general, the apex has a certain radius of curvature. For this reason, the step portion of the saw tooth may scatter light, which may degrade the pixel image transmitted through the step portion." (see paragraph 0033 of the document). Further, a rubbing processing of the substrate surface for orienting liquid crystal molecules can be performed insufficiently at the step portion, especially at the bottom of the wedge shape, which can cause abnormal arrangement of liquid crystal molecules. Therefore, light can be scattered also at the bottom of the wedge. Furthermore, the lenticular lens and the liquid-crystal polarization cell are required to be made of the same material, otherwise distortion of those elements is caused due to the difference of their shrinkage factors, in a case that the structure is increased in size, and such the situation can make a viewpoint displacement and an abnormal display coming from leakage of scattered light. To solve the problem, a method to use a silica glass for the substrate can be given. However, general silica glass is so expensive to be hardly used in large-sized products, which is also a problem.

In the structures disclosed in Matsuda et al. (Matsuda et al., Appl. Opt., Vol. 36, No. 20, pp. 4772-4778, 1997) and Nose et al. (Nose et al., Jpn. J. Appl. Phys., Vol. 39, No. 11, pp. 6383-6387, 2000), the lens-shift amount is so small as to be insufficient to track a viewpoint, which is a problem. Further, Matsuda et al. and Nose et al. do not propose any idea to apply their techniques to a stereoscopic image display device.

Lu et al. (Lu et al., J. Display Technol., Vol. 7, No. 4, pp. 215-219, 2011) discloses the structure using stripe-shaped electrodes to establish a refractive-index profile in a Fresnel-lens shape in order to make the cell gap thin. The form of a Fresnel lens is so sharp to be hardly realized by a liquid-crystal lens with accuracy, and such a liquid-crystal lens can bring a deterioration of image-forming properties and an increase of stereoscopic crosstalk. Further, a liquid crystal layer is put within the cell so as to induce a homogeneous alignment of liquid crystal molecules so as to be parallel with the direction of stripes of the transparent electrodes. Therefore, when a potential difference of neighboring stripe-shaped electrodes becomes large, molecules of liquid crystal rotate in the direction perpendicular to the direction of stripes which can disturb the alignment of liquid crystal molecules. Further, in the structure, a voltage applying pattern has been established so as to realize the optimum lens properties for the initial lens alignment and the initial lens pitch without estimating a lens shift. The structure of the document just switches 2D display and 3D display, and neither a system to tracking a viewpoint nor a similar idea is proposed in the document.

The structure disclosed in JP-A No. 2009-104137 has stripe-shaped electrodes whose intervals and widths are not uniform. Therefore, it is difficult to shift the refractive-index profile within the substrate plane (namely, in an x-y plane or the horizontal direction) with keeping its form. Further, it is difficult to track a viewpoint in this structure because there is no idea to shift a lens in the document.

The structure disclosed in JP-B No. 4687073 has stripe-shaped electrodes whose intervals and widths are not uniform. Therefore, it is difficult to shift the refractive-index profile within the substrate plane (namely, in the horizontal direction) with keeping its form. Further, it is difficult to control the refractive-index profile at a midway point of neighboring pixels, because the lens pattern is independent for each pixel. Therefore, it is difficult to track a viewpoint in this structure because there is no idea to shift a lens in the document.

The structure disclosed in JP-B No. 3940725 has a liquid-crystal lens wherein an electrode is arranged only at the edge section thereof. Therefore, the electrode is fixed and is hardly moved within the substrate plane (namely, in the x-y plane or the horizontal direction). Further, it is difficult to track a viewpoint in this structure because there is no idea to shift a lens in the document.

The structure disclosed in JP-B No. 3814366 has a liquid-crystal lens wherein stripe-shaped electrodes are connected with a resistance wire, the voltage is hardly adjusted on each electrode separately, and the lens pitch is determined by the length of the resistance wire. Therefore, it is difficult to shift the refractive-index profile in the horizontal direction and is difficult to track a viewpoint in this structure because there is no idea to shift a lens in the document.

The structure disclosed in JP-A No. 2010-56712 uses a liquid-crystal lens as an image separating element. Regarding the structure of the liquid-crystal lens, pixel electrodes are arranged in matrix, and a liquid-crystal lens panel on which dots are formed is composed of the pixel electrodes, electrodes on a counter substrate and liquid crystal. The pixel electrodes electrically control the refractive index of the liquid crystal at each of the dots independently so as to rotate the refractive-index profile. However, each dot is required to be driven with an active element such as a TFT (Thin-Film Transistor), which increases the number of TFT elements, wires and outputs of the driver forming the liquid-crystal lens panel corresponding to an increase of the resolution of the image display panel and further brings a reduction of the yield, a reduction of the aperture ratio, and an increase of cost. Further, there is not proposed a method to translate the refractive-index profile under the condition that an observer moves in the horizontal direction of the display panel plane (the y-z plane), for example, in the y-axis direction, to go away from the rotation axis (the x-axis). Therefore, it is difficult to keep the stereoscopic view in the disclosed structure under such the condition.

In the structure of JP-A No. 2002-328333, separating microscopic liquid-crystal cells with light-shielding members makes the manufacturing processes complicate and causes a reduction of the yield. Further, controlling each of the cells with a TFT element separately can cause an increase of cost. In the microscopic cells, since liquid crystal in a boundary area does not move, a smooth form of the refractive-index profile is hardly obtained when a lens function is obtained by combining plural cells, which is insufficient as a light-wavefront control. In other words, such the structure may sufficiently converge light onto the position of an observer but forms an image which has a low quality, is distorted and has great aberrations. Further, there are no descriptions about the alignment conduction of liquid crystal in this document, and it is actually difficult to form a refractive-index profile which is so smooth to realize a stereoscopic image, just by applying voltages to the electrodes. If in a simple matrix structure under a uniform molecular alignment states which is as simple as that used in a general liquid-crystal lens, a changed voltage is applied to each of neighboring working areas (each being equivalent to a microscopic cell), a display pixel is affected by leakage electric fields coming from neighboring display pixels on the all sides including up, down, left, right and diagonals, as an external disturbance. This situation causes a disturbance of the molecular alignment of liquid crystal (disclination line) and brings a difficulty of an excellent control of the refractive-index profile.

SUMMARY

There are disclosed illustrative stereoscopic image display devices as embodiments of the present invention, which can adjust the stereoscopic perceptive region to an optimum position corresponding to the viewpoint of an observer, and can prevent a loss of stereoscopic effect from a perceived image even when an observer moves.

An embodiment illustrating one aspect of the present invention is a stereoscopic image display device comprising: an image display unit, a gradient-refractive-index liquid-crystal lens arranged at an observer's side of the display surface of the image display unit; and a liquid-crystal lens drive circuit for driving the liquid-crystal lens. The image display unit includes a plurality of unit pixels arranged in matrix, for forming images on the display surface thereof, where each of the unit pixels includes a pixel for a left viewing field and a pixel for a right viewing field. The liquid-crystal lens includes a liquid-crystal cell including two transparent substrates facing each other, a liquid crystal layer put between the transparent substrates, and polarization elements formed on the transparent substrates, respectively. The liquid-crystal lens further includes a plurality of electrode groups formed on a surface facing the liquid crystal layer of one of the transparent substrates, where each of the electrode groups includes a plurality of stripe-shaped transparent electrodes corresponding to a column of the unit pixels of the image display unit. The liquid-crystal lens further includes a counter transparent electrode formed on the other of the transparent substrates and having a constant potential. The liquid-crystal lens drive circuit is configured to apply voltages to the plurality of transparent electrodes with forming a common voltage pattern for each of the electrode groups so as to make liquid crystal of the liquid crystal layer work as a plurality of lenses forming a predetermined refractive-index profile for each of the electrode groups by driving the liquid crystal by using a voltage difference between the plurality of transparent electrodes and the counter transparent electrode. The liquid-crystal lens drive circuit is further configured to shift the voltage pattern according to information of a viewpoint position of an observer so as to shift the refractive-index profile of each of the lenses.

The stereoscopic image display device may further comprise a detector for detecting the viewpoint position of the observer. As the detector, the stereoscopic image display device may employ a sensor for recognizing a viewpoint or face contours by using an imaging device, such as a CCD (Charge Coupled Device), and may employ a viewpoint tracking unit configured to sense the shift amount of the viewpoint. Alternatively, as the detector, the stereoscopic image display device may employ a structure configured to sense a tilt and shift of the stereoscopic image display device including a liquid-crystal lens with an acceleration sensor and a tilt sensor and to calculate or estimate the shift amount and the shift direction of the observer's viewpoint position based on outputs of those sensors.

In place of the detector for detecting the viewpoint position, the stereoscopic image display device may include an input unit configured to mechanically input information of the viewpoint position, such as a lever and a touch panel. Thereby, the information of the viewpoint position is directly given to the liquid-crystal lens drive circuit by operations of the input unit. Alternatively, the information of the viewpoint position may be directly inputted as values onto a personal computer or a display device, such that the information of the viewpoint position is given to the liquid-crystal lens drive circuit electrically from outside of the stereoscopic image display device. Further, the information of the viewpoint position may be given to the stereoscopic image display device with a general input method other than the above-described way to directly give the information by using a signal from an external control device such as the above-described touch panel and the above-described personal computer. When the information of the viewpoint position is given in an arbitrary way, the position where an observer can perceive a stereoscopic image can be adjusted in an arbitrary manner.

Further, the counter transparent electrode forming the liquid-crystal lens may have a solid shape or a shape of stripes. The transparent electrodes and the counter transparent electrode may be arranged such that the transparent electrodes or both of the transparent electrodes and the counter transparent electrode are bent at a plurality of positions at constant intervals. As another embodiment, the liquid-crystal lens drive circuit may be configured to adjust focal lengths of the plurality of lenses based on a maximum voltage value of the voltage pattern to be applied to the transparent electrodes.

As another embodiment, the one of the transparent substrates on which the transparent electrodes are arranged may be located farther from the image display unit than the other of the transparent substrates, and the other of the transparent substrates on which the counter transparent electrode is arranged may be located closer to the image display unit than the one of the transparent substrates.

As another embodiment, the transparent electrodes and the counter transparent electrode may be arranged such that stripe structures of the transparent electrodes are superimposed on stripe structures of the counter transparent electrode when viewed from a normal direction of the transparent substrates, or such that stripe structures of the transparent electrodes are shifted not to be superimposed on stripe structures of the counter transparent electrode when viewed from a normal direction of the transparent substrates.

As another embodiment, there may be provided one polarization plate at a position between the liquid-crystal lens and the image display unit, and the one polarization plate may serve as both of a polarization element for use in the image display unit and one of the polarization elements for use in the liquid-crystal lens.

As another embodiment, the stereoscopic image display device may further comprise a plurality of metal wires where the number of the metal wires is the same as the number of the transparent electrodes forming one of the electrode groups. The metal wires may extend perpendicularly to an extending direction of stripe structures of the transparent electrodes, and transparent electrodes arranged at a same position in the respective electrode groups may be connected to one of the metal wires through an interlayer insulating layer.

As another embodiment, the stereoscopic image display device may further comprise a plurality of lead wires being connected to the metal wires and extending in the extending direction of the stripe structures of the transparent electrodes, and the lead wires may be formed directly below the respective transparent electrodes. The lead wires may extend over a full length of the stripe structures of transparent electrodes. The lead wires may be smaller in width than the stripe structures of the transparent electrodes.

As another embodiment, the stereoscopic image display device may use a flat-panel display such as a liquid-crystal display unit and an organic electro-luminescence display unit as the image display unit.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIG. 1 is an arrangement plan of the liquid-crystal lens (liquid-crystal GRIN lens), liquid-crystal display unit (liquid-crystal panel), light source (backlight) of a stereoscopic image display device relating to Example 1;

FIG. 3A is a diagram illustrating a method to track a viewpoint relating to Example 1;

FIG. 3C is a diagram illustrating another method to track a viewpoint relating to Example 1;

FIGS. 4A to 4C are a diagram illustrating an arrangement of electrodes and a liquid crystal molecular alignment on applying zero voltage to the electrodes of the liquid-crystal lens relating to Example 1, a diagram illustrating a refractive-index profile of the liquid-crystal lens, and a table of an example of a way to apply voltages to the electrodes;

FIGS. 7A to 7D are a diagram illustrating an arrangement of electrodes and a liquid crystal molecular alignment on changing the focal length of the liquid-crystal lens relating to Example 1, a diagram illustrating a refractive-index profile of the liquid-crystal lens, and tables of examples of a way to apply voltages to the electrodes;

Figure 10A:
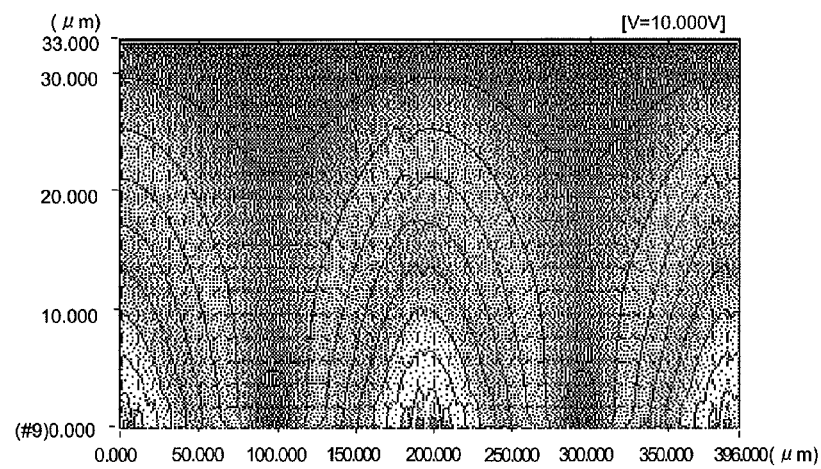
Figure 10B:
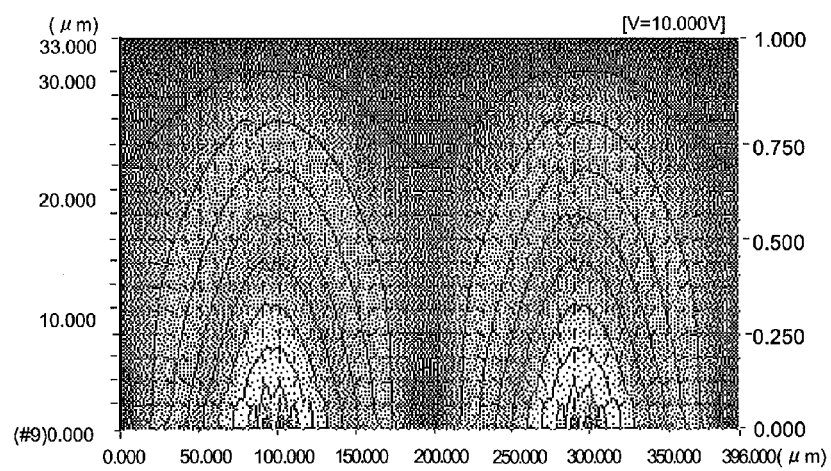
Figure 11A:
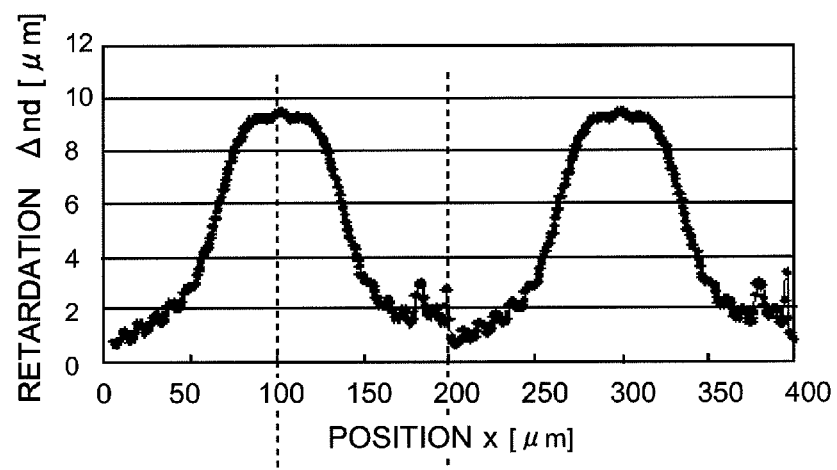
Figure 11B:
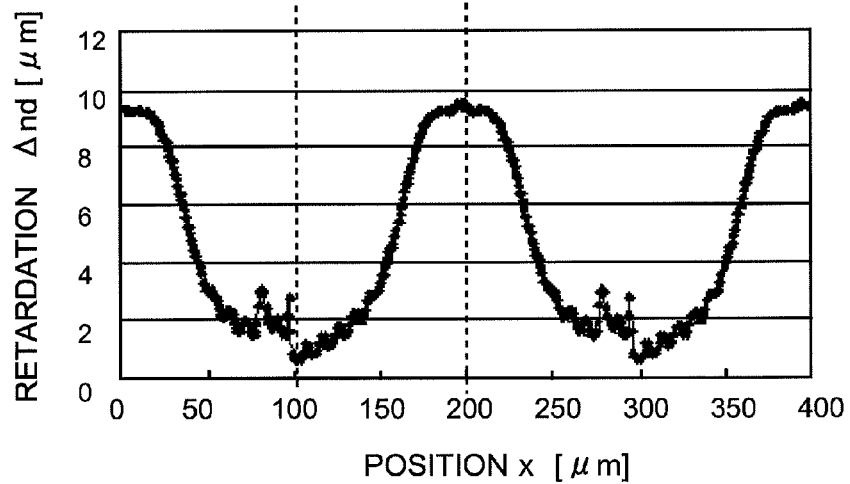
Figure 12A:
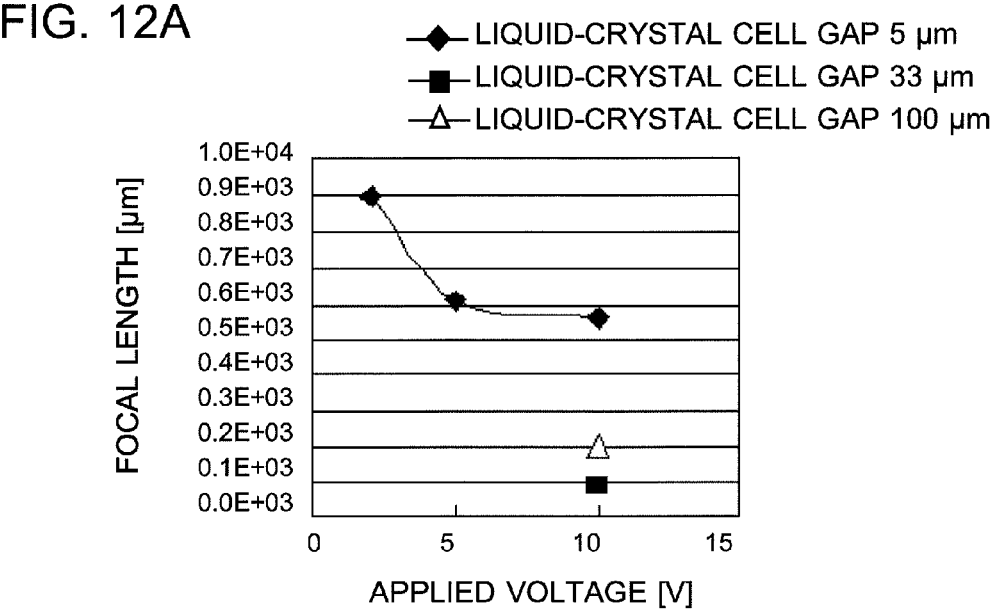
Figure 12B:
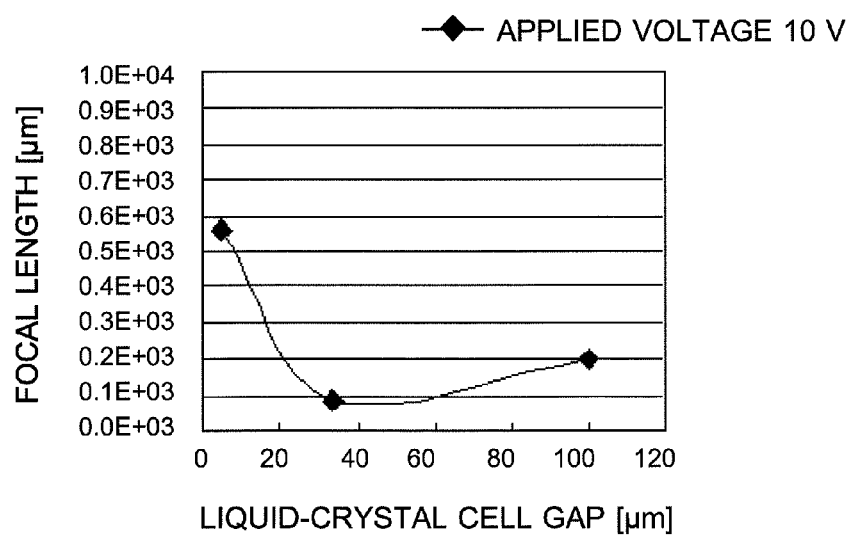
Figure 13A:
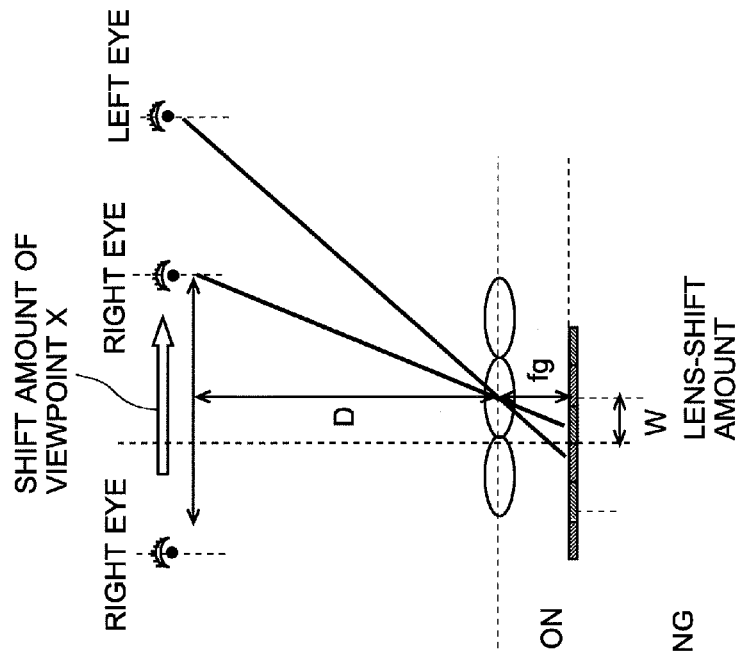
Figure 13B:
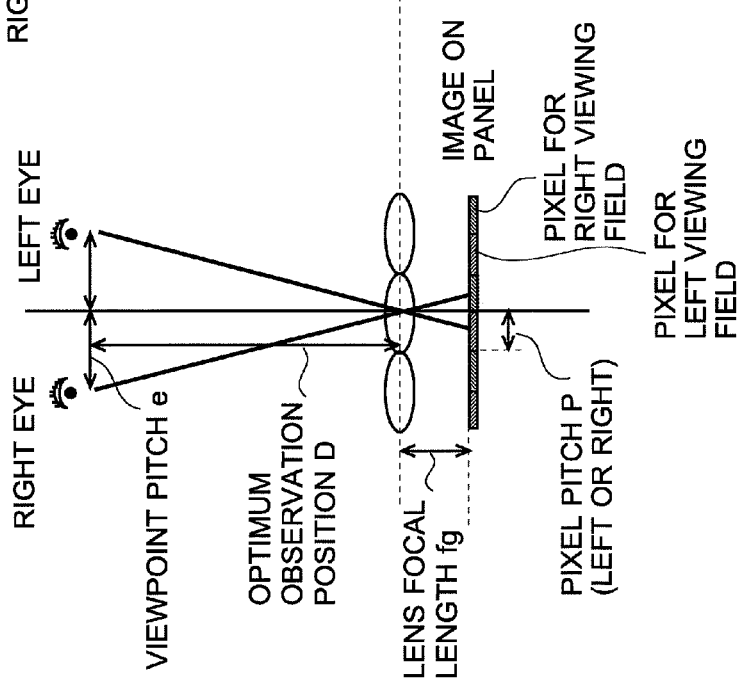
Figures 14A, 14B, 14C:
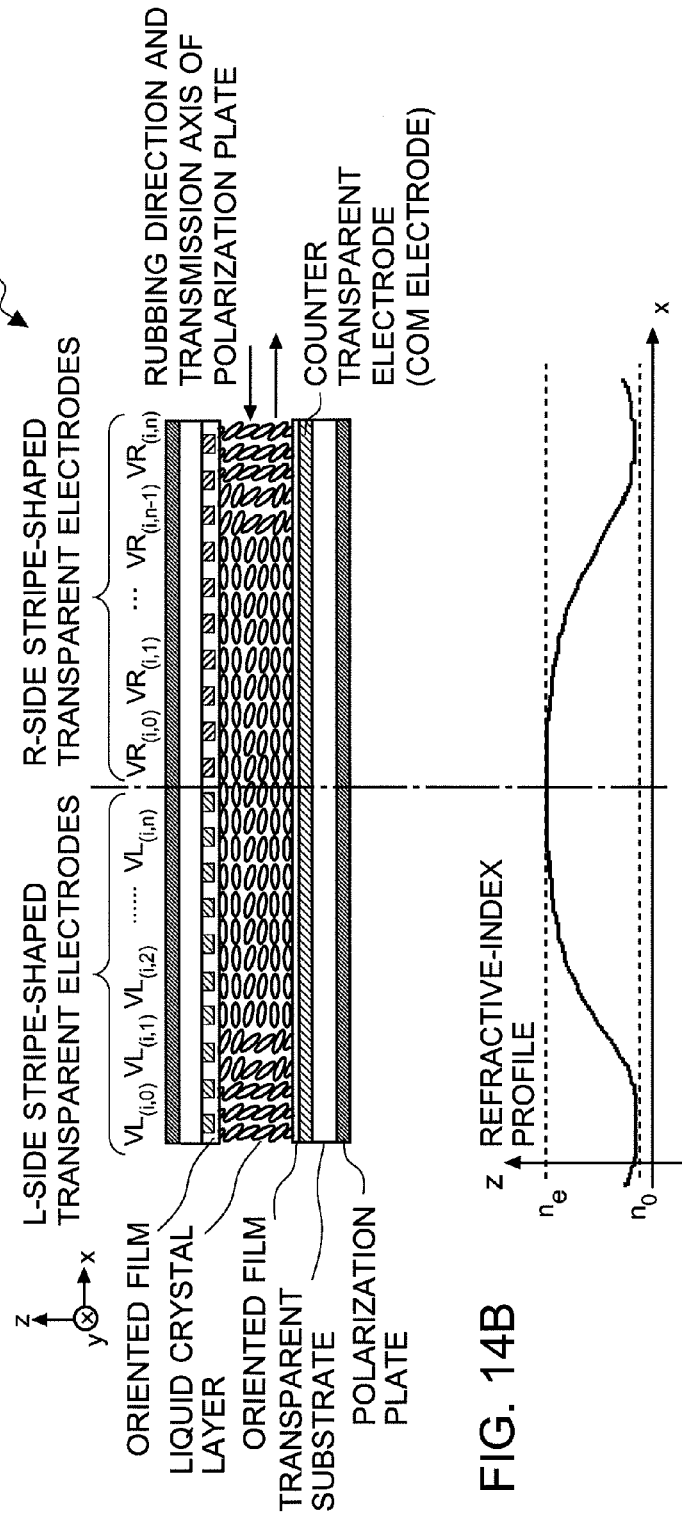
Figure 15A:
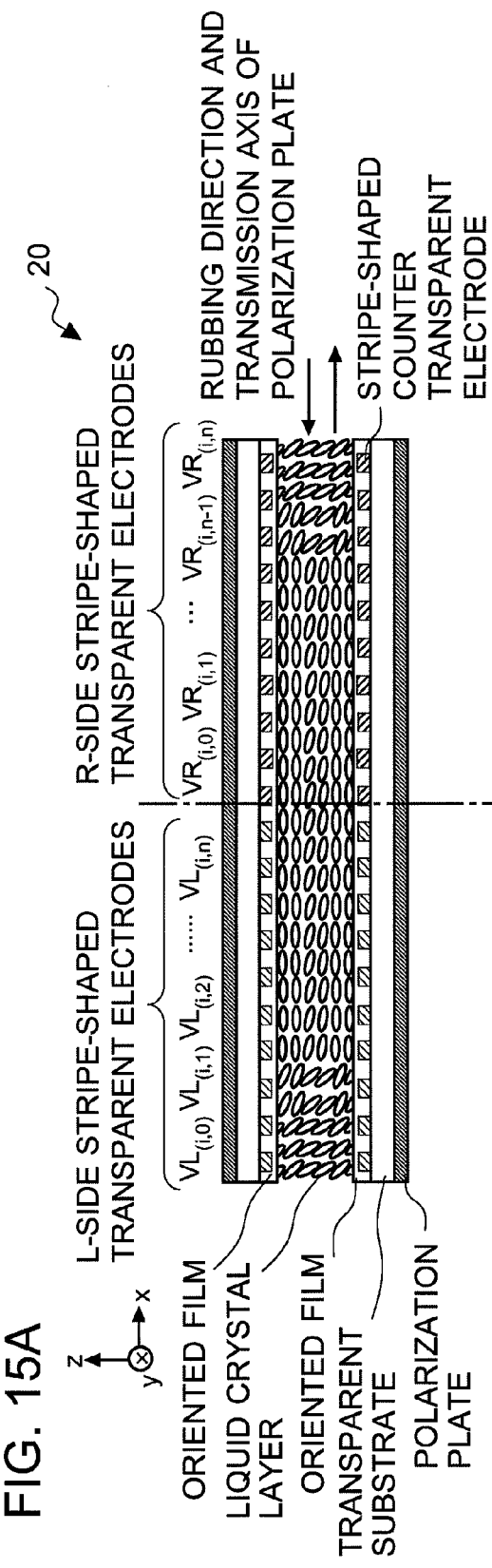
Figure 15B:
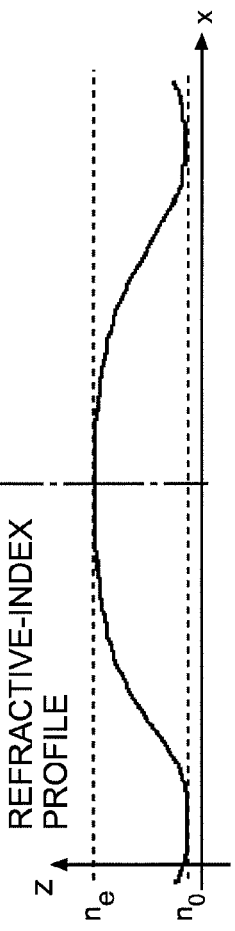
Figure 16A:
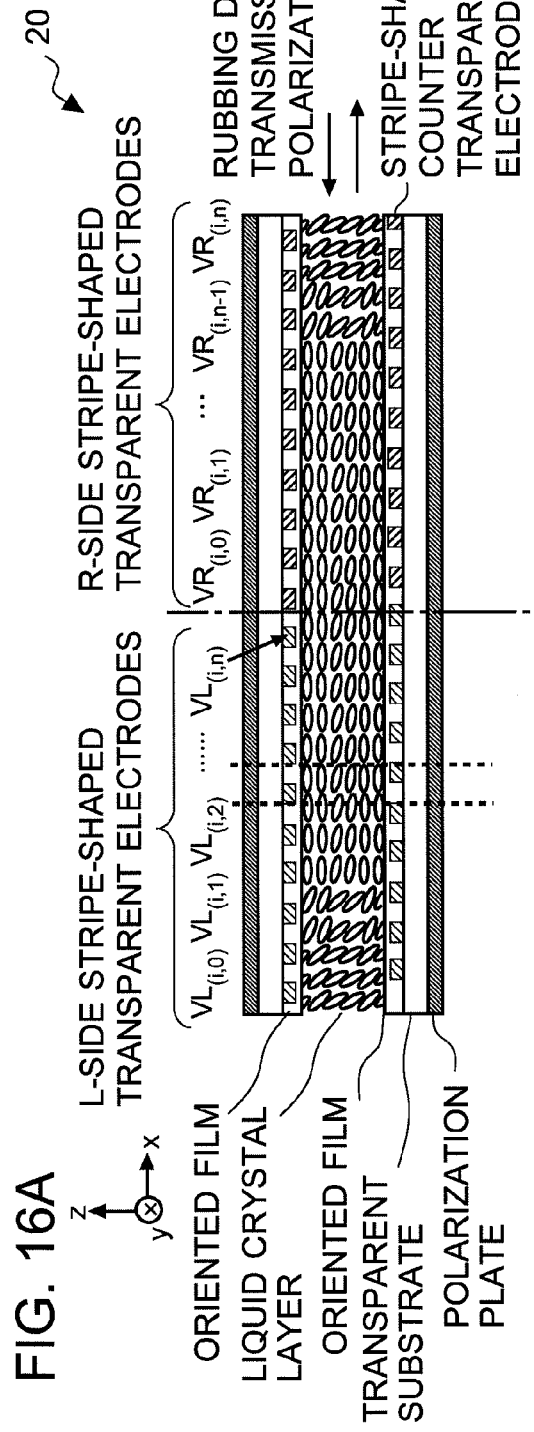
Figure 16B:
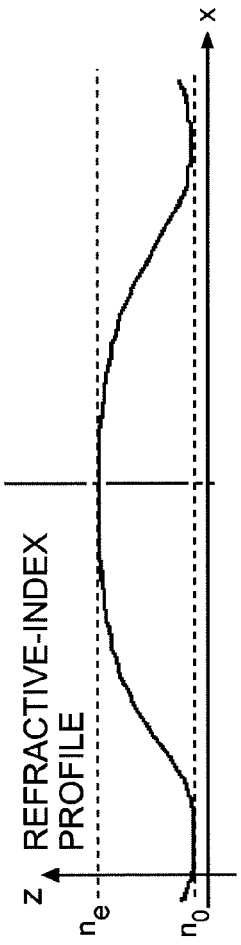
Figures 17A, 17B:
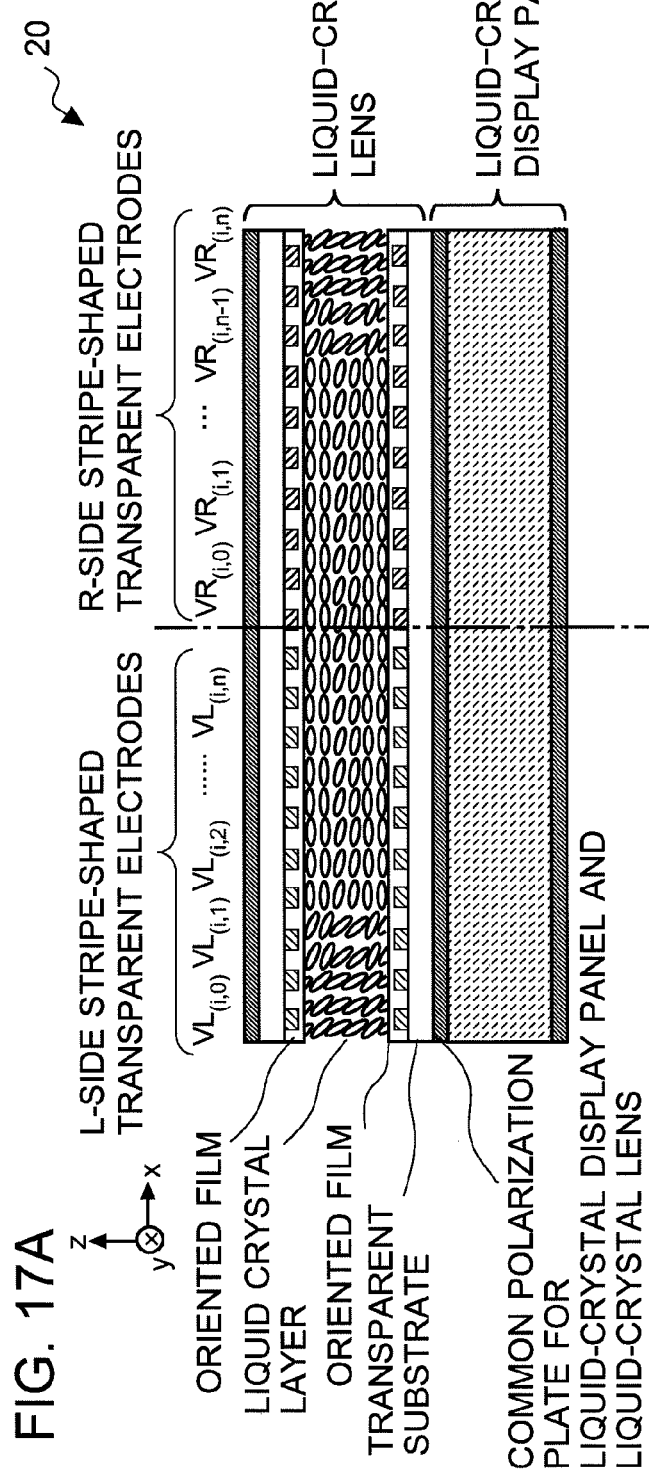
Figure 18:
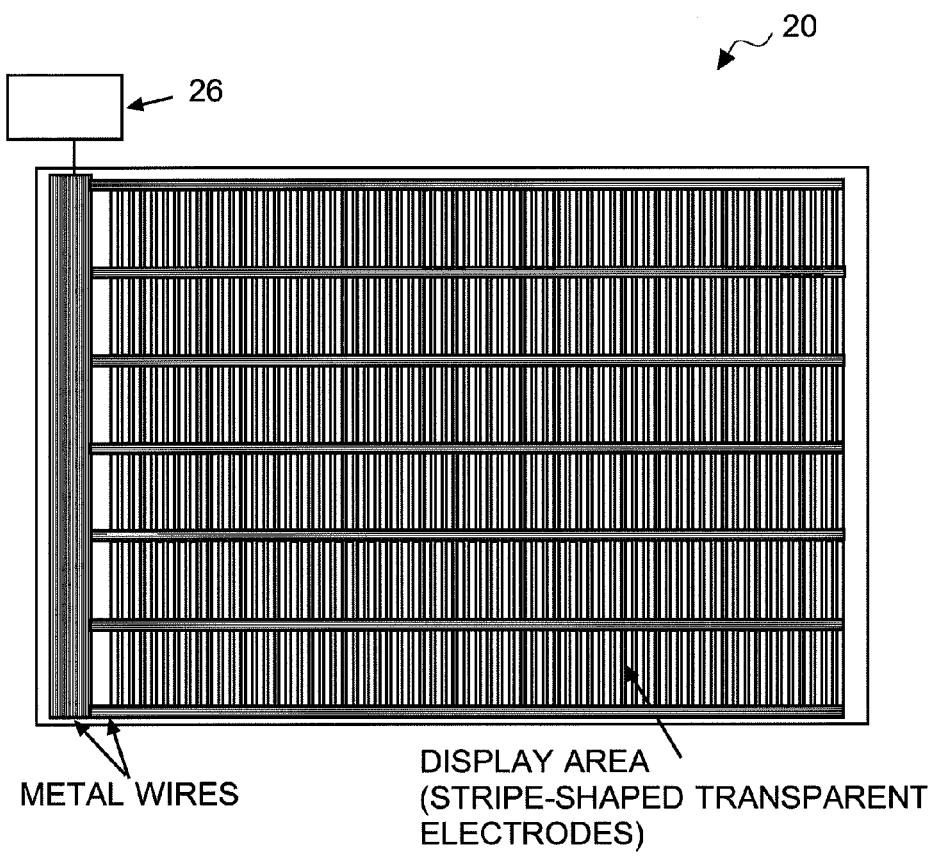
Figure 19:
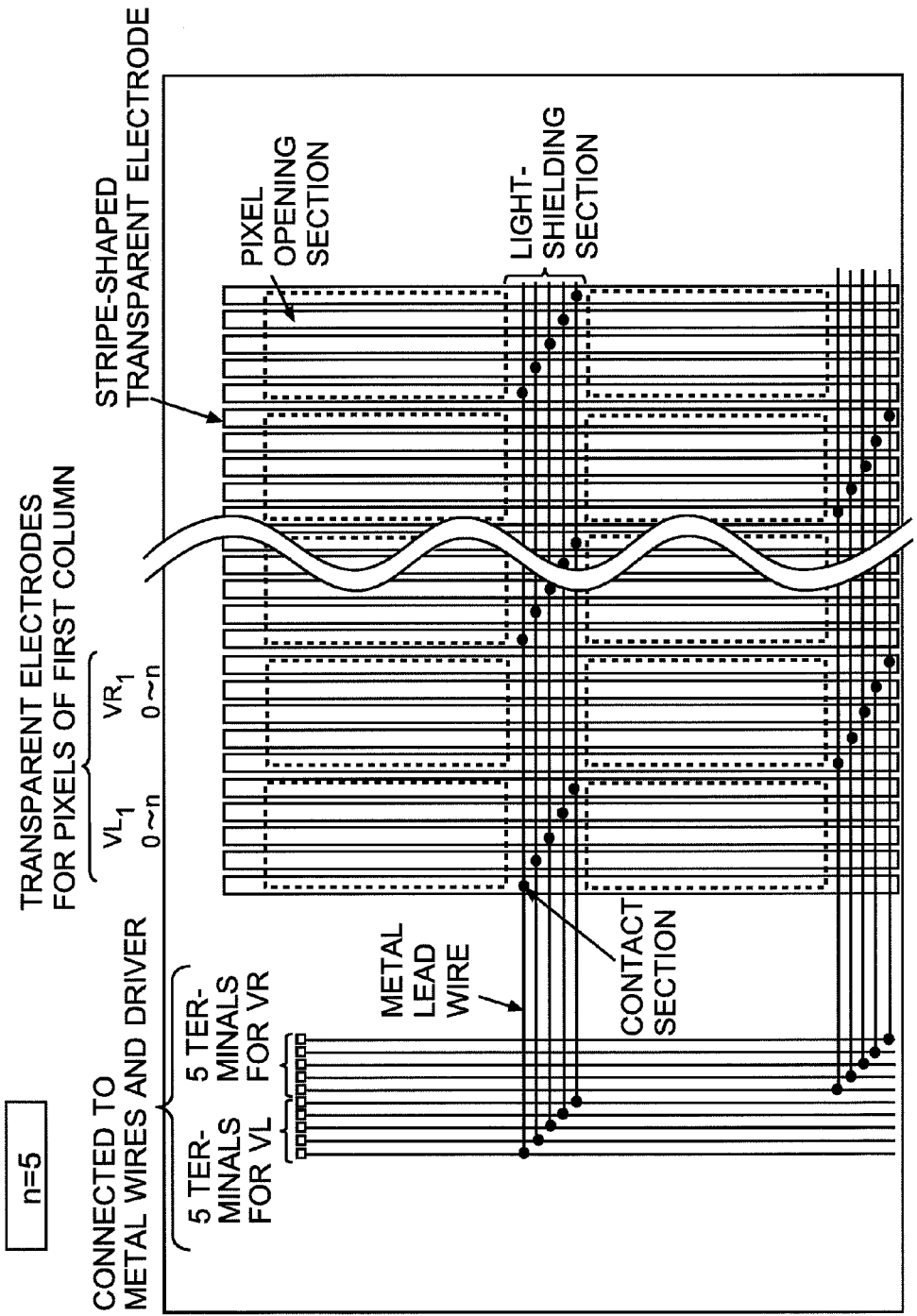
Figure 20A:
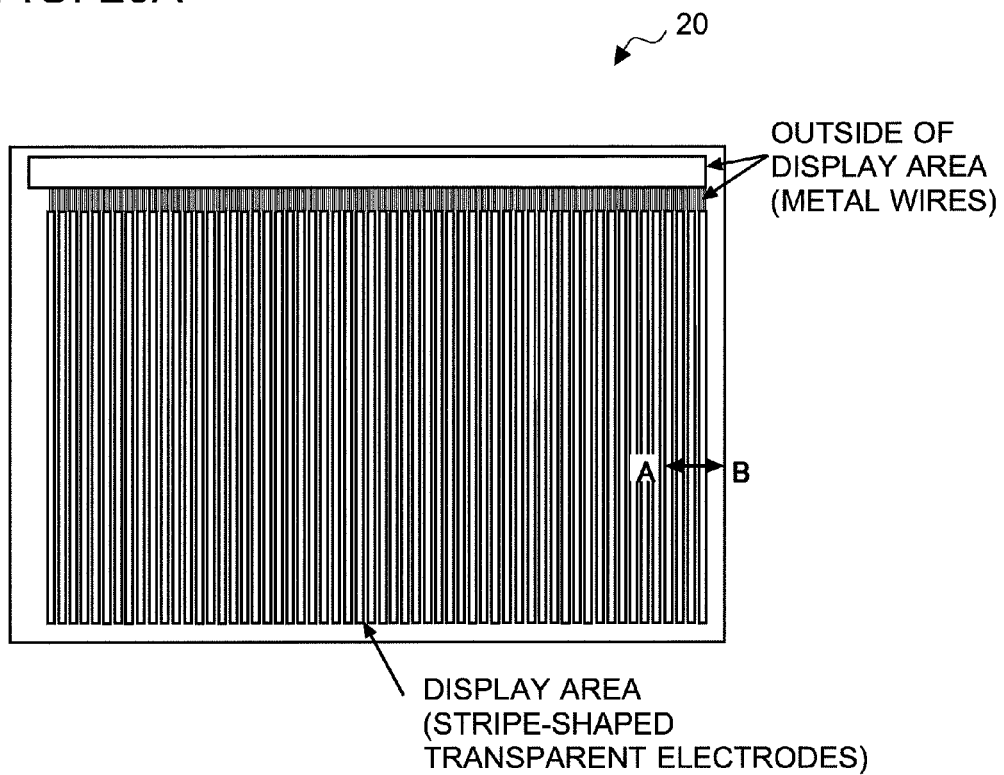
Figure 20B:
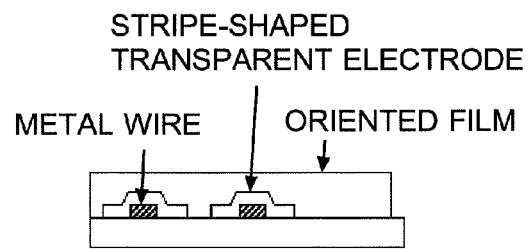
Figure 21:
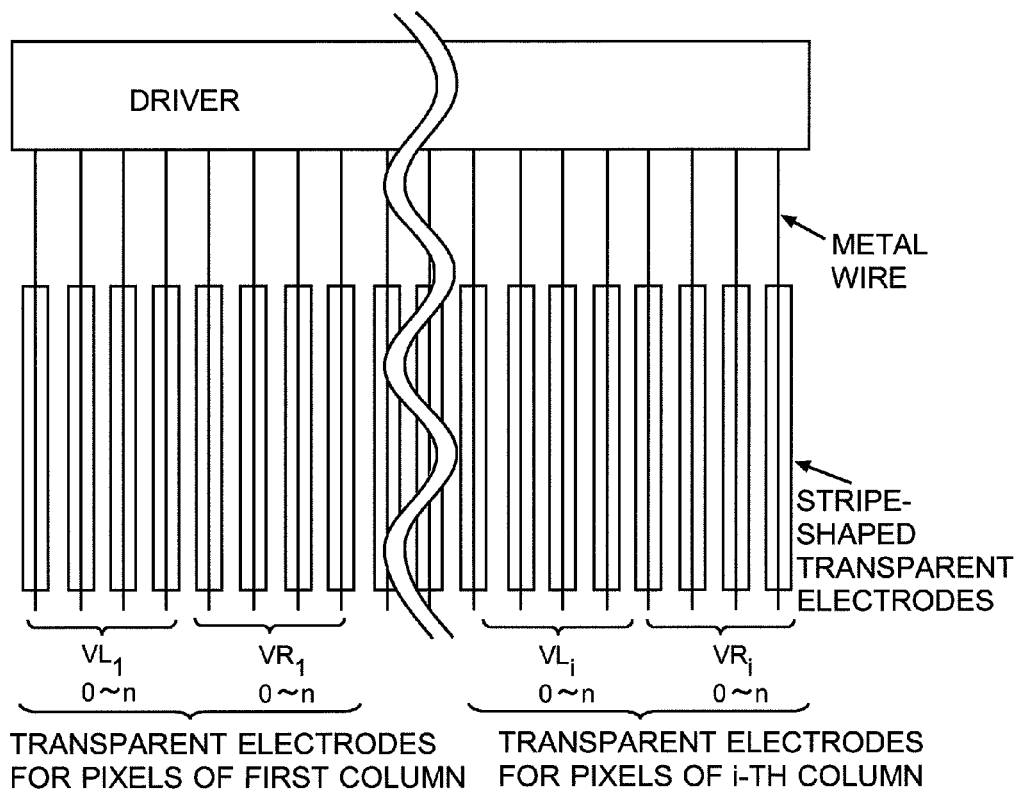
Figure 22:
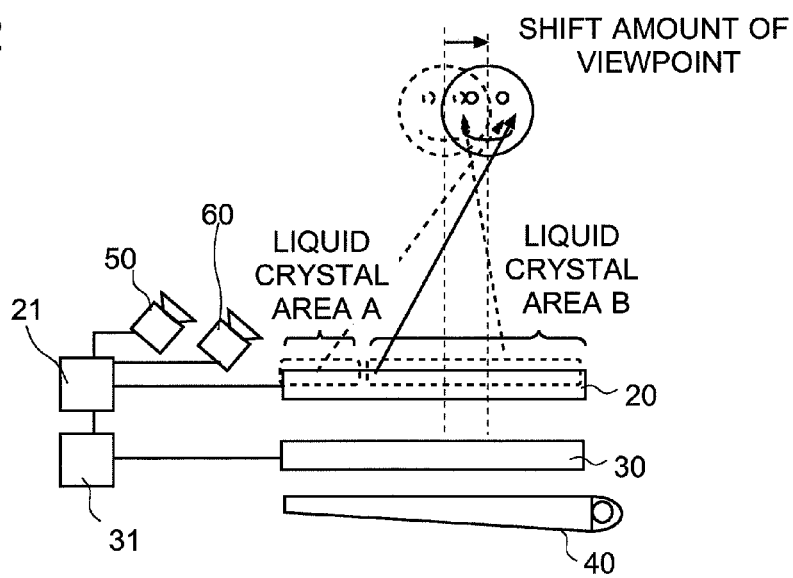
Figure 23:
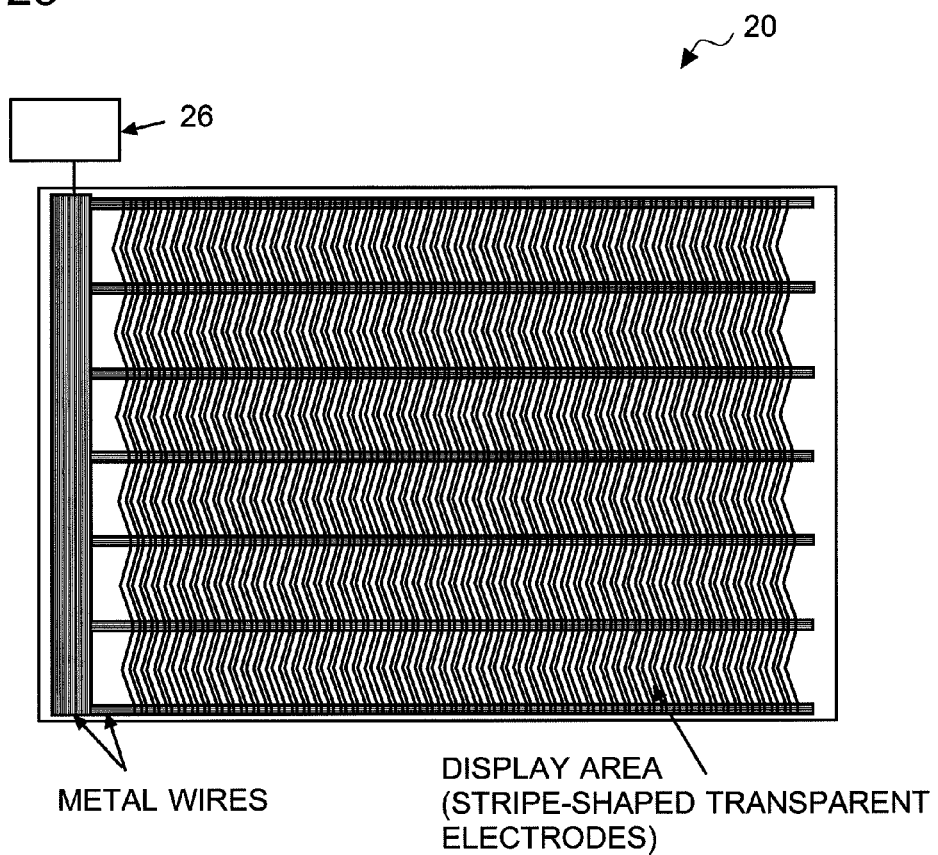
Figure 24:
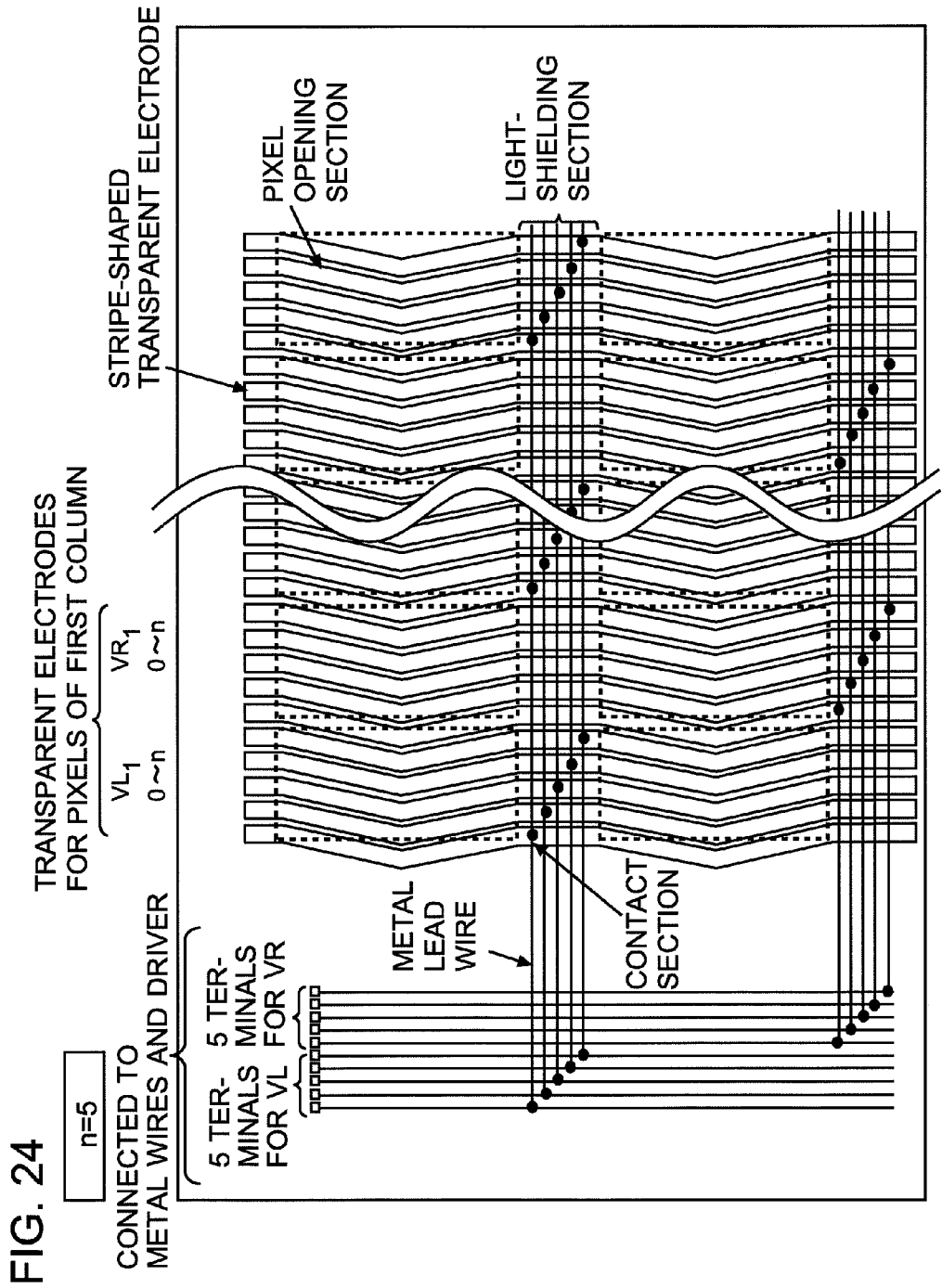
Figure 25A:
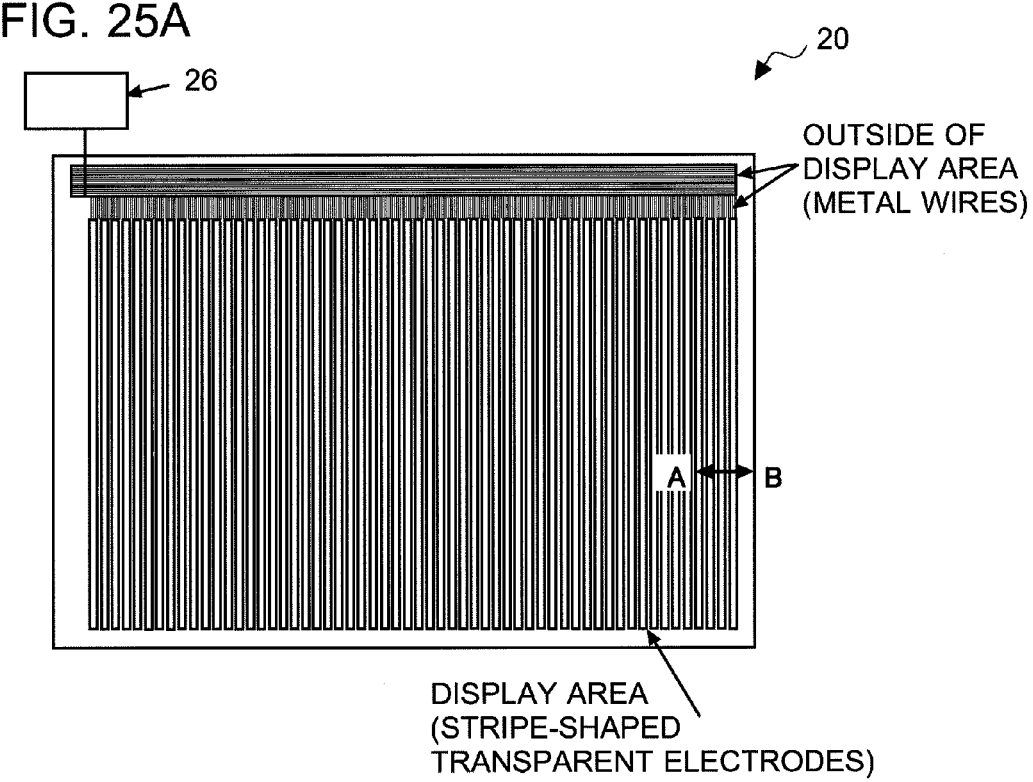
Figure 25B:
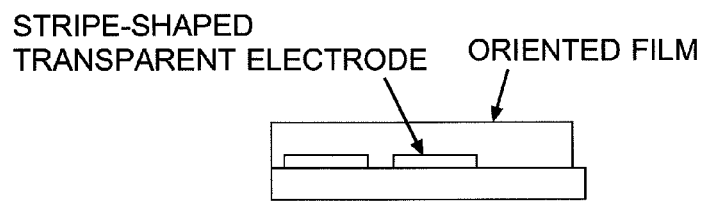

Each of FIGS. 10A and 10B is a diagram illustrating a simulation result of a profile of liquid crystal director and a potential profile of the liquid-crystal lens relating to Example 1;

Each of FIGS. 11A and 11B is a diagram illustrating a simulation result of a shift of refractive-index profile of the liquid-crystal lens relating to Example 1;

Each of FIGS. 12A and 12B is a diagram illustrating a simulation result of a control of the focal length of the liquid-crystal lens relating to Example 1;

Each of FIGS. 13A and 13B is a diagram illustrating a relationship of the viewpoint-shift amount and the lens-shift amount relating to Example 1;

FIGS. 14A to 14C are a diagram illustrating an arrangement of electrodes and a liquid crystal molecular alignment on applying voltages to the electrodes of the liquid-crystal lens relating to Example 2, a diagram illustrating a refractive-index profile of the liquid-crystal lens, and a table of an example of a way to apply voltages to the electrodes;

FIGS. 15A and 15B are a diagram illustrating an arrangement of electrodes and a liquid crystal molecular alignment on applying voltages to the electrodes of the liquid-crystal lens relating to Example 3 and a diagram illustrating a refractive-index profile of the liquid-crystal lens;

FIGS. 16A and 16B are a diagram illustrating an arrangement of electrodes and a liquid crystal molecular alignment on applying voltages to the electrodes of the liquid-crystal lens relating to Example 4 and a diagram illustrating a refractive-index profile of the liquid-crystal lens;

FIGS. 17A and 17B are a diagram illustrating an arrangement of electrodes and a liquid crystal molecular alignment on applying voltages to the electrodes of the liquid-crystal lens relating to Example 5 and a diagram illustrating a refractive-index profile of the liquid-crystal lens;

FIG. 18 is a diagram illustrating the arrangement of metal wires and stripe-shaped transparent electrodes of the liquid-crystal lens relating to Example 6;

FIG. 19 is a diagram illustrating the way to connecting the lead wires extending from the metal wires and the stripe-shaped transparent electrodes of the liquid-crystal lens relating to Example 6;

FIGS. 20A and 20B are diagrams illustrating the arrangement of metal wires and stripe-shaped transparent electrodes of the liquid-crystal lens relating to Example 7;

FIG. 21 is a detailed diagram illustrating the way to connecting the metal wires and the stripe-shaped transparent electrodes of the liquid-crystal lens relating to Example 7;

FIG. 22 is a diagram illustrating the situation that the shift amount and the focal length of the liquid-crystal lens are changed separately for areas of the image display screen, in the stereoscopic display device relating to Example 7;

FIG. 23 is a diagram illustrating the arrangement of metal wires and stripe-shaped transparent electrodes which are bent of the liquid-crystal lens relating to Example 8;

FIG. 24 is a diagram illustrating the way to connecting the lead wires extending from the metal wires and the stripe-shaped transparent electrodes which are bent of the liquid-crystal lens relating to Example 8;

FIGS. 25A and 25B are diagrams illustrating the arrangement of metal wires and stripe-shaped transparent electrodes of the liquid-crystal lens relating to Example 9; and FIG. 26 is a diagram illustrating the way to connecting the metal wires and the stripe-shaped transparent electrodes of the liquid-crystal lens relating to Example 9.

DETAILED DESCRIPTION

Illustrative embodiments of stereoscopic image display devices will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

An embodiment of the present invention is a stereoscopic image display device comprising: an image display unit, a gradient-refractive-index liquid-crystal lens arranged at an observer's side of the display surface of the image display unit, and a liquid-crystal lens drive circuit for driving the liquid-crystal lens. The image display unit includes a plurality of unit pixels arranged in matrix, for forming images on a display surface thereof, where each of the unit pixels includes a pixel for a left viewing field and a pixel for a right viewing field. The liquid-crystal lens includes a liquid-crystal cell including two transparent substrates facing each other, a liquid crystal layer put between the transparent substrates, and polarization elements formed on the transparent substrates, respectively. The liquid-crystal lens further includes a plurality of electrode groups formed on a surface facing the liquid crystal layer of one of the transparent substrates, where each of the electrode groups includes a plurality of stripe-shaped transparent electrodes corresponding to a column of the unit pixels of the image display unit. The liquid-crystal lens further includes a counter transparent electrode formed on the other of the transparent substrates and having a constant potential. The liquid-crystal lens drive circuit is configured to apply voltages to the plurality of transparent electrodes with forming a common voltage pattern for each of the electrode groups so as to make liquid crystal of the liquid crystal layer work as a plurality of lenses forming a predetermined refractive-index profile for each of the electrode groups by driving the liquid crystal by using a voltage difference between the plurality of transparent electrodes and the counter transparent electrode. The liquid-crystal lens drive circuit is further configured to shift the voltage pattern according to information of a viewpoint position of an observer so as to shift the refractive-index profile of each of the lenses.

The above embodiment provides a stereoscopic imaging system wherein operations of the viewpoint tracking sensor and the shift of the liquid-crystal lens are linked together, which can prevent a loss of stereoscopic effect from a perceived image even when an observer moves.

Further, for shifting the stereoscopic perceptive region so as to track the viewpoint, the system electrically controls the refractive-index profile of the liquid-crystal lens mounted on the panel of the image display device, which provides an effect similar to that provided by the conventional system to move a reticular lens. Further, the liquid crystal layer continuously exists in the whole of the lenses in the system, which can provide a sufficiently smooth refractive-index profile. In other words, the system forms a refractive-index profile equivalent to that of a reticular lens, by continuously controlling the neighboring stripe-shaped transparent electrodes. Therefore, even under the uniform alignment, such as a vertical alignment and a homogeneous alignment, of liquid crystal molecules, the system hardly makes a disclination line and forms a sufficiently smooth refractive-index profile.

Further, such the system can electrically realize a switching of a 2D display and 3D display by using a liquid-crystal lens. Additionally, the system does not need a servo mechanism which is mechanical and is configured to move lenses, which realizes a decrease in thickness and size of the system itself. Further, the liquid-crystal lens includes stripe-shaped transparent electrodes to which equivalent electric potentials are applied cyclically. A predetermined refractive-index profile is formed on each cycle of the transparent electrodes by driving the liquid crystal, which drives the liquid crystal as lenses. Further, by applying equivalent electric potentials to the transparent electrodes cyclically, drivers and wires which are required to drive the liquid crystal are reduced in number, which realizes a stereoscopic image display device which can move the stereoscopic viewpoint (at which the observer can perceive a stereoscopic image) with tracking the viewpoint of the observer, at low cost.

Hereinafter, stereoscopic image display devices each using a liquid-crystal lens of various examples will be described, for describing the embodiments of the present invention more concretely.

Example 1

First, a structure, operations, a manufacturing method and manufacturing procedures of a stereoscopic image display device using a liquid-crystal lens will be described below with referring to FIGS. 1 through 13B.

As shown in FIG. 1, stereoscopic image display device 10 of the present example includes a liquid-crystal lens (liquid-crystal GRIN lens in this example) 20, an image display unit (liquid-crystal panel 30 in this example) and a light source (backlight 40 in this example).

Liquid crystal display panel 30 includes plural columns of unit pixels, where each of the unit pixels is composed of a pixel for a left viewing field and a pixel for a right viewing field neighboring in the first direction and the plural columns extend in the second direction being perpendicular to the first direction. A liquid-crystal-display-panel drive circuit drives the liquid crystal display panel 30. Since liquid crystal display panel 30 and backlight 40 have the similar structures to those of a general liquid-crystal display device for use in a stereoscopic image display device, a structure and a controlling method of liquid-crystal lens 20 will be described hereinafter.

A liquid-crystal panel (liquid-crystal cell) for liquid-crystal lens 20 is manufactured as the followings. There are provided transparent substrates, such as glass substrates, facing each other. On one of the transparent substrate, there are formed plural stripe-shaped transparent electrodes corresponding to the columns of unit pixels, respectively. On the other of the transparent substrates (the counter substrates), there is formed an electrode (referred as a counter transparent electrode) facing the transparent electrodes on the one of the transparent substrates. The transparent substrates are joined together after an orientation process of on the transparent substrates in the direction perpendicular to the extending direction of the stripe structures of the transparent electrodes. After liquid crystal is put between the transparent substrates, a polarization plate is joined to each of the transparent substrates to manufacture the liquid-crystal panel (liquid-crystal cell). In the process, as for the liquid crystal molecules, liquid-crystal molecule directors are aligned in the direction perpendicular to the extending direction of the stripe structures of the transparent electrodes to form a homogeneous alignment. Then, the liquid crystal is driven by the potential difference between the plural transparent electrodes and the counter transparent electrode. Table 1 shows main properties of the liquid-crystal lens 20.

TABLE 1

| | Items | Properties and Simulation Settings |
|---|---|---|
| Liquid Crystal Material | Birefringence and Dielectric Anisotropy | BL015*[1] ($\Delta n = 0.281$, $\Delta\epsilon = 18.4$) |
| Liquid Crystal Cell | Alignment State | Homogeneous alignment, Pre-tilt: 0.5 degrees |
| | Electrode Arrangement | Width of ITO electrodes: 4 μm, Electrode gap: 5 μm |
| | Number of Electrodes per Lens Pitch | 22 (Pitch: 198 μm) |
| | Applied Voltage (V) | 0-10 V |
| | Gap (μm) | 33 μm |
| Lens Properties | Lens Pitch (μm) | 198 μm |
| | Lens-Shift Amount*[2] *[3] (μm) | 0-198 μm 0-90 mm (Viewpoint-shift amount under the above lens shift) |
| | Focal Length and Cell Gap*[5] (in glass as a medium) for Applied Voltage of 10 V | Cell gap / Focal length*[4]: 5 μm / 5645 μm; 33 μm / 854 μm; 100 μm / 1997 μm |
| | Focal Length and Applied Voltage (in glass as a medium) for Cell Gap of 5 μm | Applied voltage / Focal length*[4]: 2 V / 8952 μm; 5 V / 6010 μm; 10 V / 5645 μm |

*[1] Product of Merck KGaA
*[2] In the case that the lens is shifted by the same shift amount to the lens pitch amount.
*[3] The lens-shift amount can be increased depending on the viewpoint-shift amount.
*[4] In the case that the value of each divided voltage is adjusted so as to from refractive-index ($\Delta$dn) profile into a shape close to a quadratic index profile.
*[5] Focal lengths at the applied voltage 10 V for cell gaps 5 μm and 100 μm are shown additionally to the focal length for the cell gap of 33 μm of Example 1.

As liquid crystal material of liquid-crystal lens 20, BL015 (birefringence $\Delta n=0.281$, dielectric anisotropy $\Delta\epsilon=18.4$) manufactured by Merck KGaA was used. To prepare transparent electrodes, a layer of ITO (Indium Tin Oxide) was formed on a surface facing the liquid crystal layer of one transparent substrate and was patterned so as to make stripe-patterned electrodes with electrode width of 4 μm and electrode gap 5 μm. To prepare a counter substrate, a counter transparent electrode (COM electrode) with a solid pattern was made to have a common potential (constant potential). The lens pitch was set to 198 μm. The number of transparent electrodes per one lens pitch was set to 22, where the number of transparent electrodes VL corresponding to a pixel for the left viewing field of liquid crystal display panel 30 was set to 11 and the number of transparent electrodes VR corresponding to a pixel for the right viewing field of liquid crystal display panel 30 was set to 11. To obtain a homogeneous alignment, an oriented film having a low pre-tilt (about 0.5 degrees) was prepared, and then, a rubbing treatment was performed on the oriented film. The cell gap of the liquid-crystal lens was set to 33 μm. Then, a polarization plate was joined to each of the transparent substrates so as to make its polarization axis (transmission axis) agree with the orientation direction (rubbing direction) to form a liquid crystal cell.

Figure 2A:
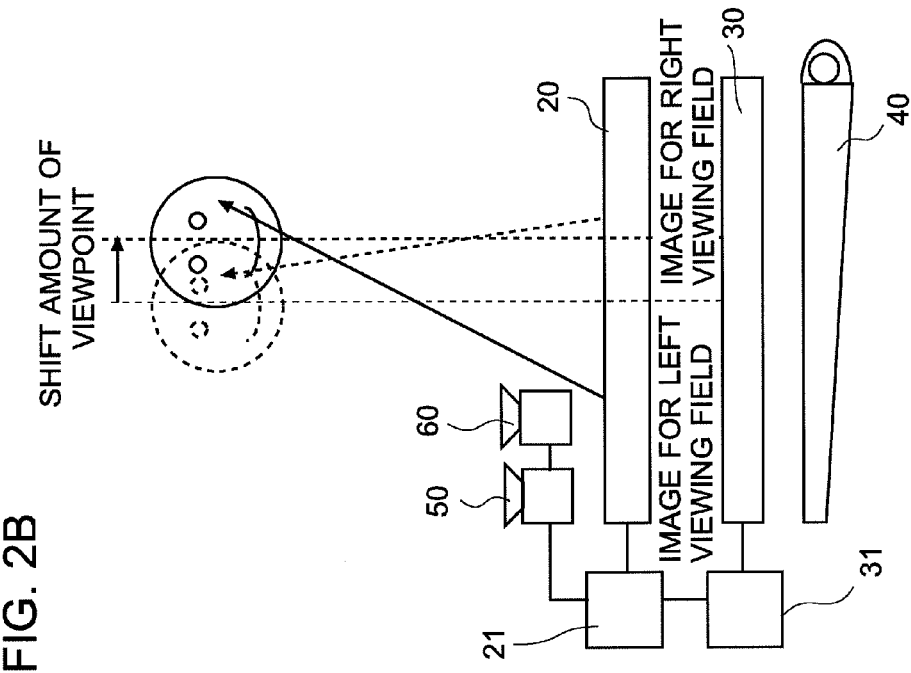
FIGS. 2A and 2B are drawings schematically illustrating operations of the a stereoscopic image display device relating to Example 1.
Figure 2B:
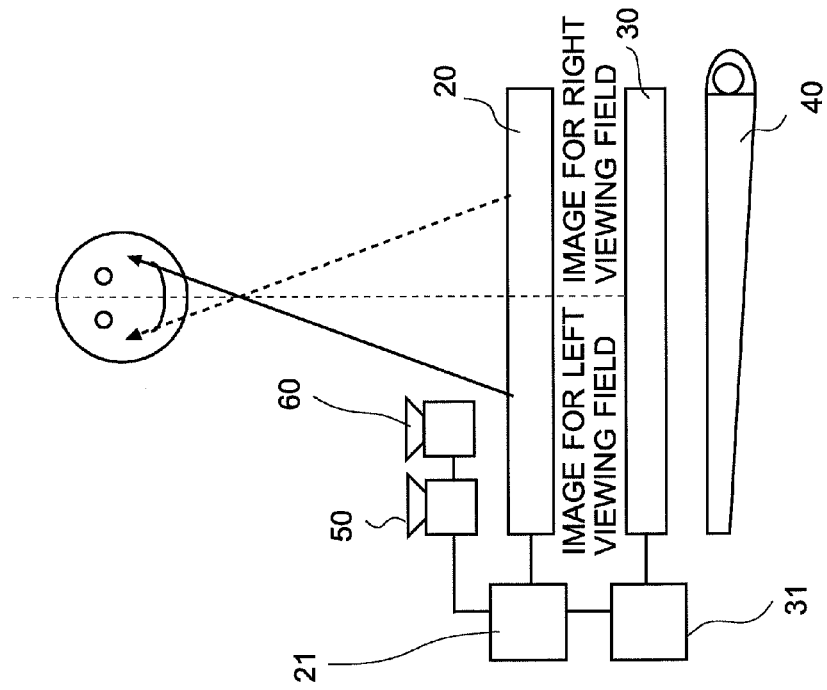

Then, stereoscopic image display device 10 was provided as follows. As shown in the arrangement of FIG. 1, liquid crystal display panel 30 and liquid-crystal lens 20 was joined together so as to make columns of pixels for the left viewing field and columns of pixels for the right viewing field of liquid crystal panel 30 agree with the extending direction of stripe-patterned electrodes. After that, a drive IC, wires and a signal substrate were welded with pressure to the joined body and the joined body was combined with backlight 40. Further, a sensor for observing a viewpoint position of an observer (CCD sensor 50 and ultrasonic sensor 60 which are shown in FIGS. 2A and 2B and will be described later) is attached on the resulting body to be connected to a signal circuit substrate (liquid-crystal lens drive circuit 21 which is shown in FIGS. 2A and 2B and will be described later) for driving liquid-crystal lens 20. Another signal circuit substrate (liquid-crystal panel drive circuit 31 shown in FIGS. 2A and 2B) for driving liquid crystal display panel 30 was connected to liquid crystal display panel 30.

When a stereoscopic display and a viewpoint tracking are carried out, liquid-crystal lens 20 is driven with being synchronized with outputs of the sensor for observing a viewpoint position of an observer as shown in FIG. 2B. Liquid-crystal lens 20 on performing 2D display is described with referring to FIGS. 4A to 4C. Each of FIGS. 4A to 4C illustrates just a part serving one lens corresponding to a column of pixels for the left viewing field and a column of pixels for the right viewing field of liquid-crystal display panel, out of plural lenses forming liquid-crystal lens 20. FIG. 4A is a sectional view of the part of liquid-crystal lens 20 taken along the direction perpendicular to the extending direction of the stripe-patterned electrodes, where the upper side of the sheet of FIG. 4A faces the observer's side and the lower side of the sheet of FIG. 4A faces the side of liquid-crystal display panel 30. FIG. 4B illustrates the refractive-index profile of the part of the liquid-crystal lens 20. FIG. 4C is a table illustrating an example of the way to apply a voltage to the stripe-shaped transparent electrodes, where V(i, n) is a voltage to be applied to a stripe-shaped transparent electrode VL or VR in the i-th pixel in the horizontal direction, and n is the number of the transparent electrodes within the half lens pitch. FIGS. 5A to 7C and 14A to 17B illustrate similar diagrams and tables to FIGS. 4A to 4C. When performing a 2D display, stereoscopic image display device 10 sets the applied voltages to 0V and displays images without driving liquid-crystal lens 20, as shown in FIG. 4C. Under this situation, the alignment of liquid crystal molecules becomes uniform as a homogenous alignment which has initially been established, and the refractive index has the constant value.

Figures 5A, 5B, 5C:
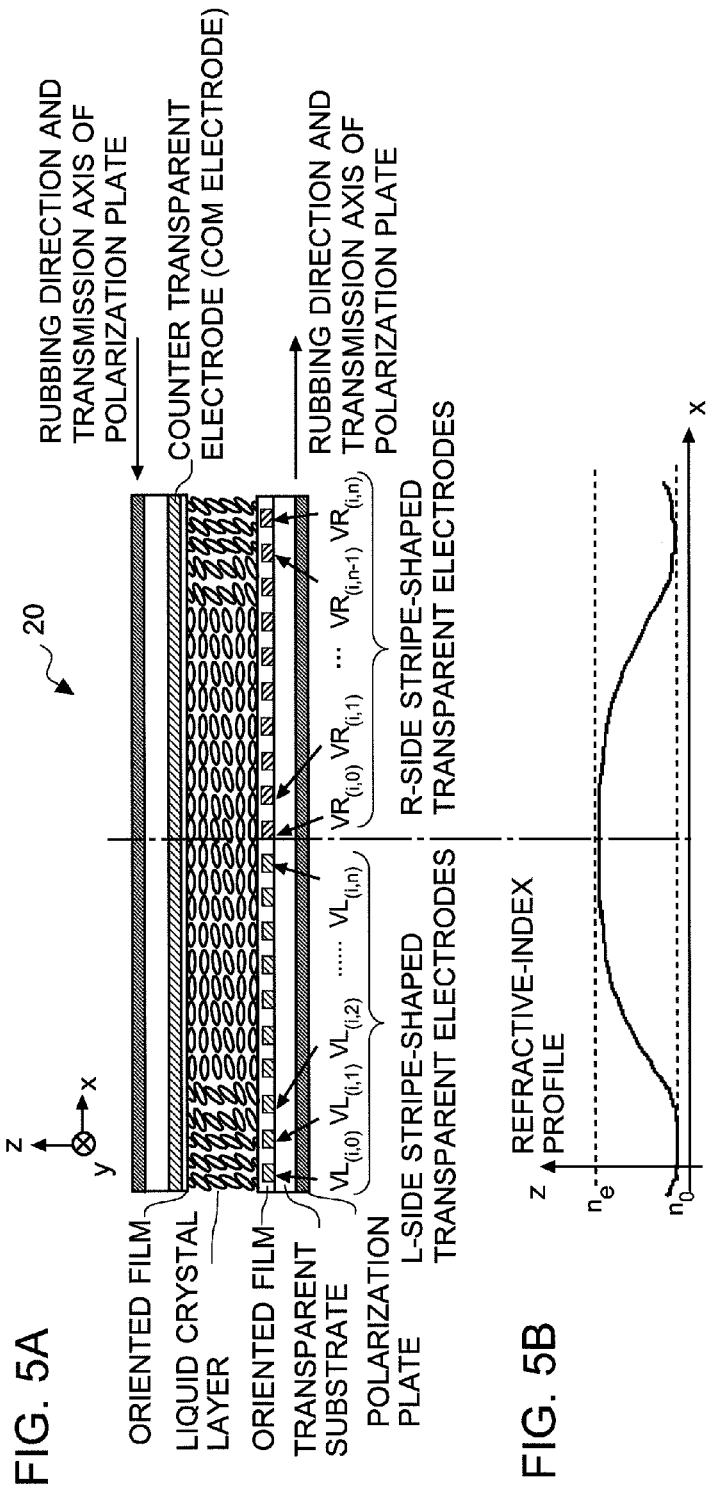
FIGS. 5A to 5C are a diagram illustrating an arrangement of electrodes and a liquid crystal molecular alignment on applying voltages to the electrodes of the liquid-crystal lens relating to Example 1, a diagram illustrating a refractive-index profile of the liquid-crystal lens, and a table of an example of a way to apply voltages to the electrodes.

On the other hand, when performing a stereoscopic display (under the situation that an observer is at rest as shown in FIG. 2A), stereoscopic image display device 10 applies appropriate voltages to liquid-crystal lens 20 to change the alignment of liquid crystal molecules and form the refractive-index profile providing lens properties as shown in FIG. 5C. For example, as shown in the table of FIG. 7D, stereoscopic image display device 10 applies continuously-changing voltages to a electrode group including stripe-shaped transparent electrodes VL0, VL1, VL2, . . . and VL10 corresponding to pixels for the left viewing field of liquid-crystal display panel 30, and stripe-shaped transparent electrodes VR0, VR1, VR2, . . . and VR10, corresponding to pixels for the right viewing field of liquid-crystal display panel 30. It is preferable that voltage values are set to VL and VR electrodes so as to form a refractive-index profile which allows an observer to perceive an optimum stereoscopic image. For example, in Example 1, the voltages are set as an initial state so as to make the maximum voltage to be 10V, such as VL0=10V, VL1=9V, VL2=8V, . . . and VL10=0V and VR0=0V, VR1=0V, VR2=1V, . . . and VR10=10V. Under this situation, a part around the minimum voltage values corresponds to the center of a lens.

Figures 6A, 6B, 6C:
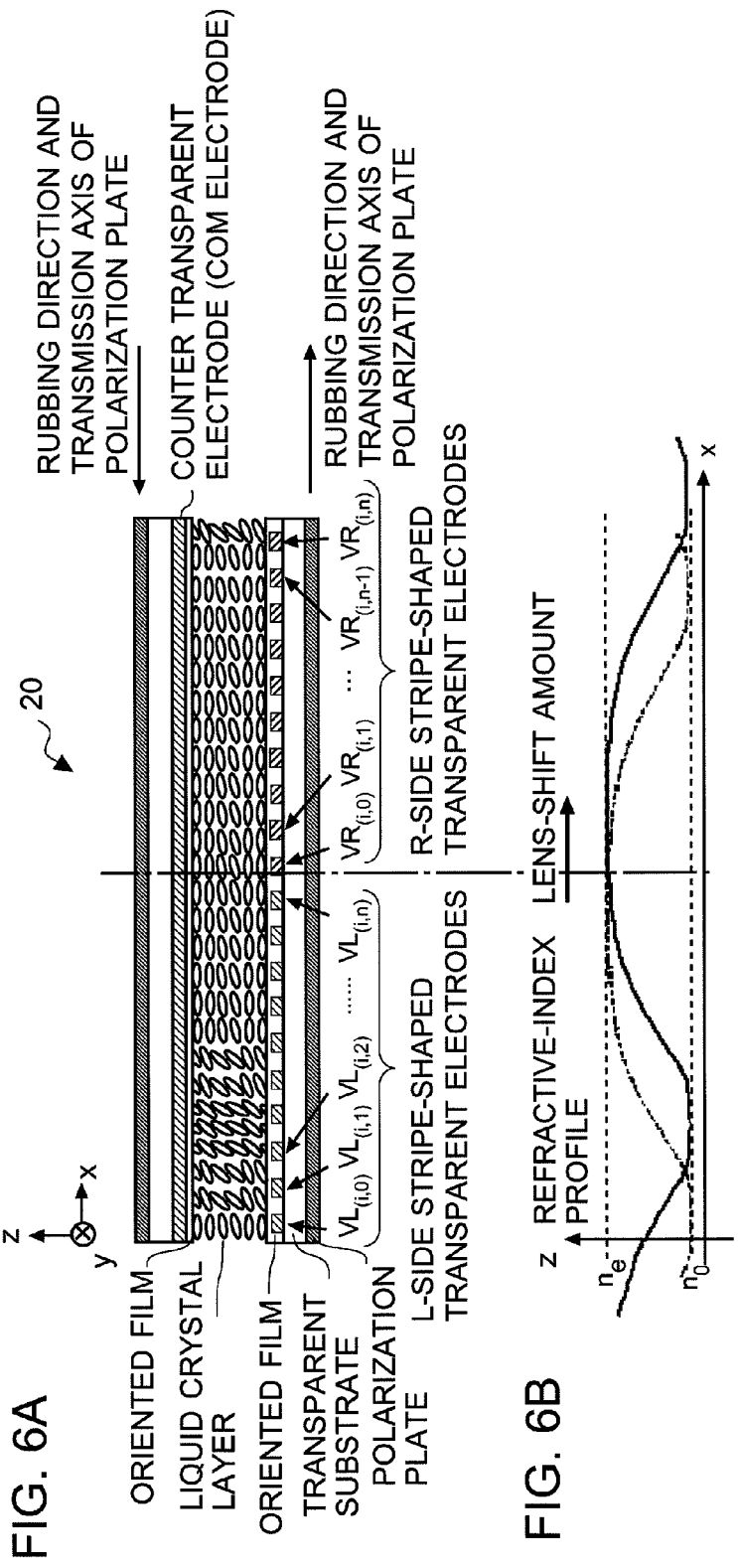
FIGS. 6A to 6C are a diagram illustrating an arrangement of electrodes and a liquid crystal molecular alignment on adjusting the voltages of the liquid-crystal lens relating to Example 1, a diagram illustrating a refractive-index profile of the liquid-crystal lens, and a table of an example of a way to apply voltages to the electrodes.

Next, when moving the center of the lens (under the situation that an observer moves as shown in FIG. 2B), stereoscopic image display device 10 changes the combination of voltage values of stripe-shaped transparent electrodes VL and VR so as to set the minimum voltage values to stripe-shaped transparent electrodes located at the shifted lens center as shown in FIG. 6C. For example, when the lens center is desired to be shifted to the position around the electrode VR3, the minimum voltage value is set to the electrodes VR3 and VR4 with the maximum voltage value 10V being kept in the electrodes. Concretely, the voltage values are set such as VL0=7V, VL1=8V, VL2=9V, . . . VL8=6V, VL9=5V and VL10=4V and VR0=3V, VR1=2V, VR2=1V, VR3=0 V . . . and VR10=10V. Under this situation, a part around the minimum voltage values corresponds to the center of a lens. FIG. 7D shows a table of applied voltage patterns before the lens center is shifted and after the lens center is shifted.

As described above, stereoscopic image display device 10 applies voltages, for example, voltages from 0 to 10V, to liquid-crystal lens 20 as applied voltages for the drive operation to obtain a lens-shaped refractive-index profile. Alternatively, as shown in FIGS. 7A to 7C, the applied voltages may be changed depending on a required focal length of liquid-crystal lens 20. FIG. 7B illustrates the refractive-index profile in the situation that the applied voltage is reduced by half to be 5V, as an example. When the applied voltage is set to the maximum value (10V), the focal length of the liquid-crystal lens 20 (in a glass as medium) is about 854 μm. FIGS. 12A and 12B illustrates the simulation results of focal lengths under other conditions. FIG. 12A illustrates the relationship of focal length and applied voltage for various cell gaps of 5 μm, 33 μm and 100 μm. FIG. 12B illustrates the relationship of focal length and call gap at the applied voltage value of 10 V. Stereoscopic image display device 10 adjusts the focal length by using the maximum value of a voltage pattern to be applied to the transparent electrodes.

FIGS. 10A, 10B, 11A and 11B illustrate the simulation results of liquid-crystal lens 20 of Example 1. FIG. 10A illustrates directors of liquid crystal molecules and the electric potential profile when the shift amount of the liquid-crystal lens 20 is 0 μm as the initial state and FIG. 10B illustrates those when the shift amount of the liquid-crystal lens 20 is 100 μm as the half lens pitch. FIG. 11A illustrates the refractive-index profile of the liquid-crystal lens 20 when the shift amount of the liquid-crystal lens 20 is 0 μm as the initial state and FIG. 11B illustrates that when the shift amount of the liquid-crystal lens 20 is 100 μm as the half lens pitch. As can be seen from FIGS. 10A to 11B, the alignment of liquid crystal molecules and the refractive-index profiles are shifted by about 100 μm with the lens properties being kept, by changing the way to apply voltages to the stripe-shaped transparent electrodes.

The shift of the refractive-index profile of liquid-crystal lens 20 is described below, by using simplified diagrams (FIGS. 13A and 13B) wherein liquid-crystal lens 20 is replaced with a lens such as a lenticular lens for easily obtaining the optimum lens-shift amount W for viewpoint-shift amount X. In the diagrams, the following Expressions (1) to (3) hold, where n is the refractive index of the lens, r is a curvature radius of the lens, fg is the focal length of the lens, D is the optimum observation distance, and γ is the incident angle of light from a pixel to the lens and β is the outgoing angle of light from a pixel to the lens.

$$(X-W)/D = \tan\beta \quad (1)$$

$$W/fg = \tan\gamma \quad (2)$$

$$\sin\beta = n\sin\gamma \quad (3)$$

When the position of the focus is located on one pixel, Expression (4) for focal length fg is obtained from Abbe's invariant.

$$n/fg - 1/D = (n-1)/r \quad (4)$$

The values of W and fg can be obtained by Expressions (1) to (4). When viewpoint-shift amount X is assumed to 30 cm and the values of fg and D are set to 0.08 cm and 39 cm, respectively, as an example, the lens-shift amount W should be about 600 μm. Strictly, the lens-shift amount is calculated with considering a light-ray tracing calculation under the condition that the lens is a gradient-refractive-index liquid-crystal lens, the environmental temperature and other conditions. Additionally, the lens pitch is set to an appropriate value, depending on the resolution of liquid-crystal display panel 30.

Next, the way to drive liquid-crystal lens 20 is described below. As shown in FIG. 3A, in order to recognize the viewpoint position of an observer and to supply an appropriate drive signal to liquid-crystal lens 20, there are provided a viewpoint position detector such as CCD sensor 50 and ultrasonic sensor 60 for recognizing a marker of a face of the observer, the viewpoint of the observer, or face contours of the observer, and liquid-crystal lens drive circuit 21 configured to drive liquid-crystal lens 20 and driver 26, in stereoscopic image display device 10. Liquid-crystal lens drive circuit 21 includes a function to process a signal given by the viewpoint position detector and calculate the shift amount and the shift direction of the viewpoint of the observer (viewpoint-shift-vector calculating section 22), a function to convert the shift amount and the shift direction of the viewpoint position to the lens-shift amount (lens-shift-amount calculating section 23), a function to move liquid-crystal lens 20 (lens-drive-function section 24) and lookup table 25. Driver 26 may be formed inside liquid-crystal lens drive circuit 21 or may be arranged on the substrate of liquid-crystal lens 20. Liquid-crystal lens drive circuit 21 also outputs a signal to synchronize the liquid-crystal lens 20 with liquid crystal display panel 30.

The procedure to detect the viewpoint position of the observer, calculate the focal length and the shift amount of liquid-crystal lens 20 and drive liquid-crystal lens 20 will be described with referring to the flowchart show in FIG. 3B.

Herein, the following terms are defined by using the coordinate systems of diagrams of FIGS. 3A, 13A and 13B.
Coordinates of the right eye's position: (xr, yr, zr)
Coordinates of the left eye's position: (xl, yl, zl)
Shift amount of the midpoint of the both eyes from the screen center in the x-axis direction: xc
Distance of the midpoint of the both eyes from the screen: D
Focal length of the liquid-crystal lens: flc
Shift amount of refractive-index profile of the liquid-crystal lens: W When an observer comes to a position to face the display surface of stereoscopic image display device 10 equipped with liquid-crystal lens 20, a human detection sensor, such as CCD sensor 50 and an infrared camera senses that somebody comes. Next, an imaging device such as CCD sensor 50 performs an imaging process to obtain image data of the face of the observer. Simultaneously, a distance measuring equipment such as ultrasonic sensor 60 measures distance D between the display surface of stereoscopic image display device 10 and the observer (S101).

Next, viewpoint-shift-vector calculating section 22 performs predetermined image processing (for example, edge enhancement processing and contour extraction processing) on the image data of the observer's face to determine eyes out of the contour lines of the observer's face (S102). Then, viewpoint-shift-vector calculating section 22 estimates the coordinates of the both eyes' positions (xr, yr, zt) and (xl, yl, zl) based on the eyes' positions and distance D between and the display screen and the observer (S103). By using the estimated values, viewpoint-shift-vector calculating section 22 calculates shift amount xc of the midpoint of the both eyes from the screen center in the x-axis direction. To extract the coordinates of the both eyes' positions, viewpoint-shift-vector calculating section 22 uses an algorithm including: extracting contour lines of the eyes and then determining the eyes' positions based on the contour lines. Viewpoint-shift-vector calculating section 22 defines the combination of the shift amount xc of the midpoint of the both eyes from the screen center in the x-axis direction obtained by this algorithm, and the distance D between the display screen obtained in step S101 as viewpoint position information (S104).

Next, lens-shift-amount calculating section 23 calculates the lens focal length flc and the shift amount W of the refractive-index profile of the liquid-crystal lens 20, based on the viewpoint position information, and outputs the shift amount W to lens-drive-function section 24 (S105). Lens-drive-function section 24 selects an applied voltage pattern to be used for forming liquid-crystal lens 20, from lookup table 25, and sends a control signal to driver 26 for driving the liquid-crystal lens 20 (S106). The driver 26 gives a certain applied voltage pattern to liquid-crystal lens 20, based on the control signal sent from lens-drive-function section 24, to shift the refractive-index profile of the liquid-crystal lens 20 (S107). These operations allow the stereoscopic image display device to adjust the stereoscopic perceptive region so as to track the viewpoint position of the observer, which realizes excellent stereoscopic properties.

Figure 3B:
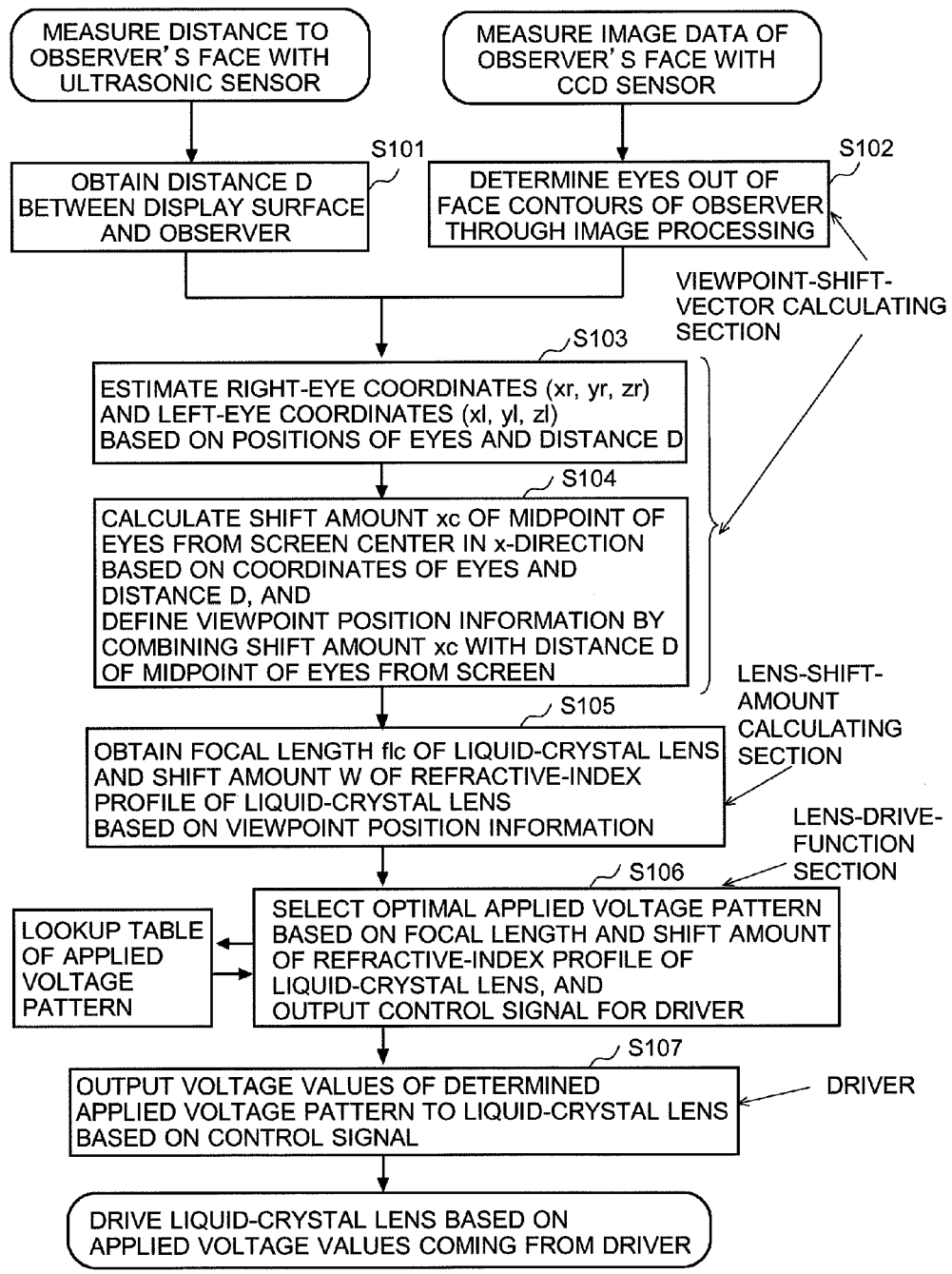
FIG. 3B is a flowchart illustrating a control procedure of the liquid-crystal lens relating to Example 1.

In the flow of FIG. 3B, the applied voltage pattern of liquid-crystal lens 20 was shifted according to the viewpoint position information calculated by the results of the image detection of the imaging sensor such as CCD sensor 50 and of the distance measurement of the measurement equipment such as ultrasonic sensor 60. Alternatively, as shown in FIG. 3C, stereoscopic image display device 10 may be equipped with input unit 70 configured to mechanically input the viewpoint position information, such as a lever and a touch panel, and shift the applied voltage pattern of the liquid-crystal lens 20 by using the viewpoint position information inputted through the input unit.

Further, the viewpoint position information can be inputted electrically from the outside of the stereoscopic image display device 10 by using a communication unit for communicating with a terminal such as a personal computer, through a cable communication or a radio communication. The stereoscopic image display device 10 may shift the applied voltage pattern of the liquid-crystal lens 20 by using the viewpoint position information inputted electrically.

As the way to detect the viewpoint position, there may be provided a structure configured to detect, other than the above viewpoint position, that a tilt and shift of the stereoscopic image display device 10 including liquid-crystal lens 20 with an acceleration sensor and a tilt sensor, and to calculate or estimate the shift amount and the shift direction of the observer's viewpoint position based on outputs of those sensors.

Figure 8A:
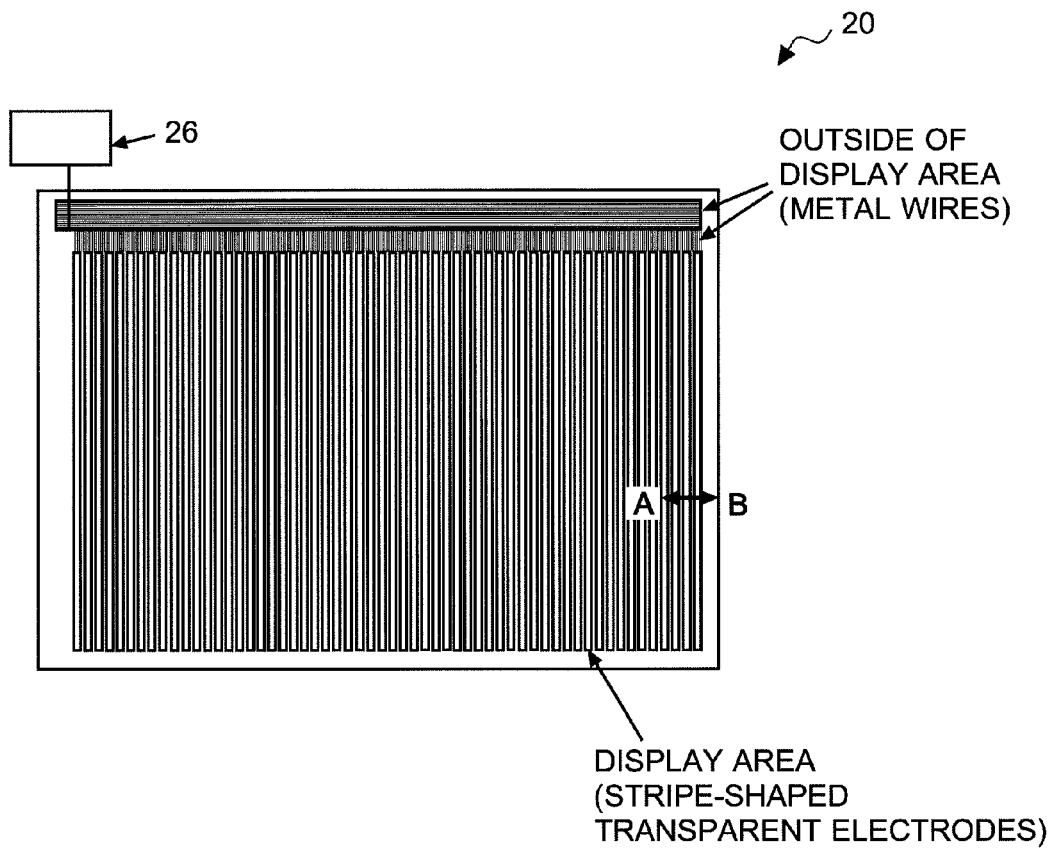
FIGS. 8A and 8B are diagrams illustrating the arrangement of metal wires and stripe-shaped transparent electrodes of the liquid-crystal lens relating to Example 1.
Figure 8B:
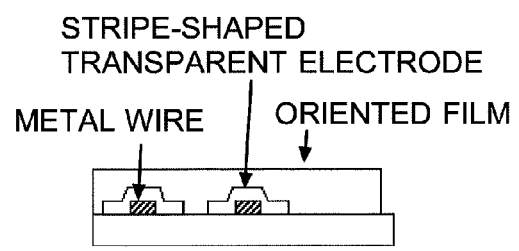

Next, the way to wire and connect driver 26 and stripe-shaped transparent electrodes formed on a transparent substrate of liquid-crystal lens 20, will be described below. As shown in FIGS. 8A and 8B, metal wires arranged at the outside the display area are connected to the stripe-shaped transparent electrodes for applying an electric field to liquid crystal, so that signals and drive voltages are supplied to the transparent electrodes through the metal wires. When this structure is used for an enlarged display screen, since the transparent electrodes have a relatively-high resistivity, each transparent electrode can cause a greater voltage reduction at a more distant position from the input end to an end of the display screen so as not to secure a required drive voltage. This situation can be improved by extending the metal wires (lead wires) inside the display area, as necessary, to be connected to the transparent electrodes. In this example, as shown in FIG. 8B, which illustrates a sectional view taken along the line A-B of FIG. 8A, metal wires which are narrower than the stripe structures of the transparent electrodes are put in the lower layer of the transparent electrodes so as to minimize the influence of the metal wires.

Figure 9:
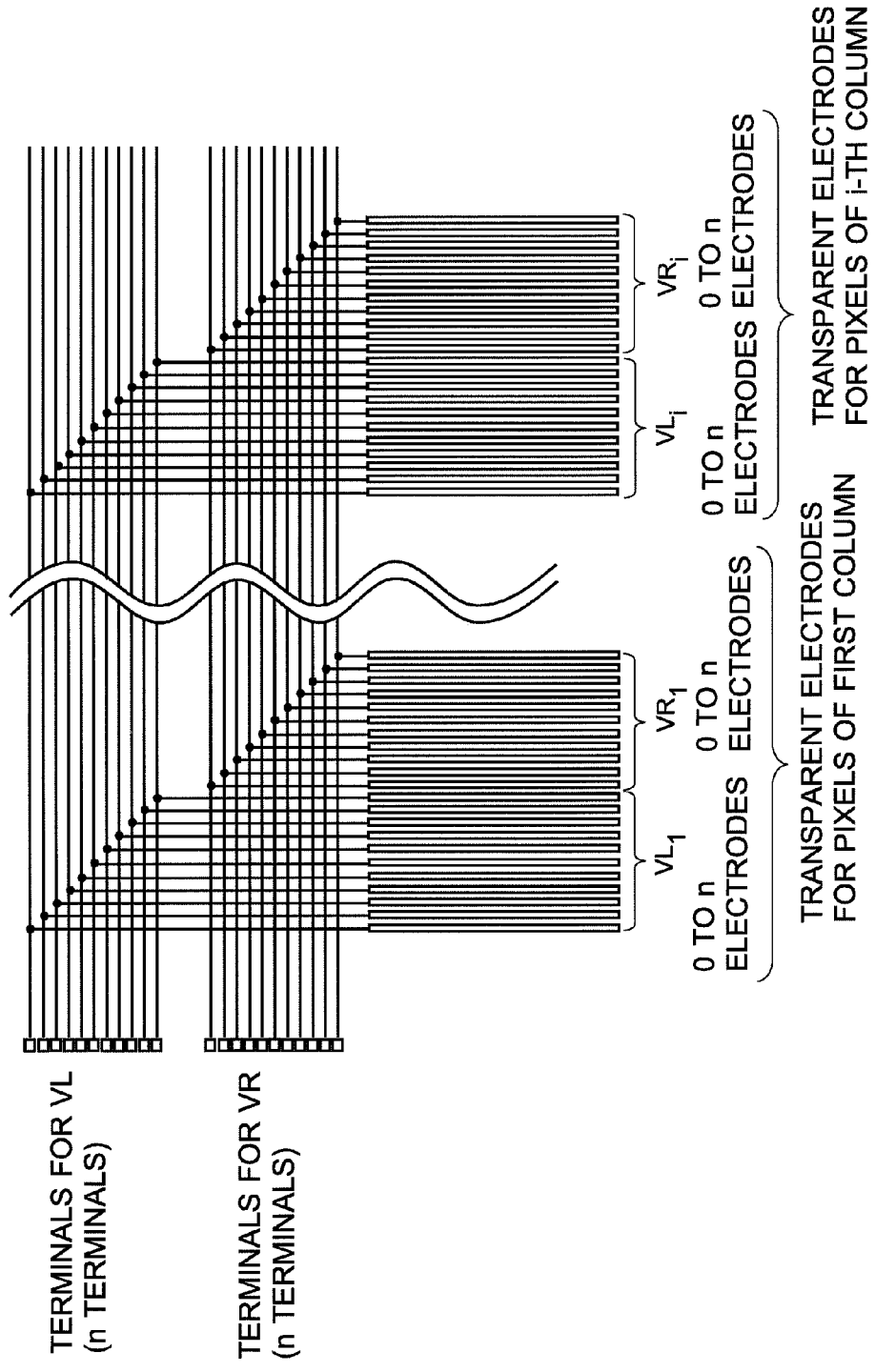
FIG. 9 is a diagram illustrating the way to connecting the metal wires and the stripe-shaped transparent electrodes of the liquid-crystal lens relating to Example 1.

Further, regarding the number of metal wires, as shown in FIG. 9, when the number of transparent electrodes for one pitch (corresponding to one column of pixels for the left viewing field and one column of pixels for the right viewing field of liquid-crystal panel 30) of liquid-crystal lens 20 is assumed as 2n, there are provided n metal wires at the VL electrode side and n metal wires at the VR electrode side, which are 2n metal wires in total, where VL electrodes represent a set of transparent electrodes forming the left side of a lens, and VR electrodes represent a set of transparent electrodes forming the right side of the lens. In this example, since n=11, the total number of the transparent electrodes is 22.

Concretely, assuming that there are formed plural electrode groups of transparent electrodes VL and VR of liquid-crystal lens 20, wherein a first electrode group for pixels of the first column, composed of transparent electrodes VL(1, 0) to VL(1, n) and transparent electrodes VR(1, 0) to VR(1, n); a second electrode group for pixels of the second column, composed of transparent electrodes VL(2, 0) to VL(2, n) and transparent electrodes VR(2, 0) to VR(2, n); . . . , and an i-th electrode group for pixels of the i-th column, composed of transparent electrodes VL(i, 0) to VL(i, n) and transparent electrodes VR(i, 0) to VR(i, n), are arranged in this order, an applied voltage is supplied to transparent electrodes VL arranged at the same position in the respective electrode groups through a corresponding VL-side metal wire and an applied voltage is supplied to transparent electrodes VR arranged at the same position in the respective electrode groups through a corresponding VR-side metal wire. Since all the transparent electrodes are formed to have a uniform width and are arranged at regular intervals, the refractive-index profile can be shifted across plural pixels by continuously changing the voltages to be applied to the transparent electrodes. In this structure, liquid-crystal lens 20 can be driven without preparing the same numbers of inputs or metal wires as all the stripe-shaped transparent electrodes.

As described above, the stereoscopic image display device of the present example can move a viewpoint at which an observer can perceive a stereoscopic image by controlling the refractive-index profile of the liquid-crystal lens. Further, since all the transparent electrodes are formed to have a uniform width and are arranged at regular intervals, the stereoscopic image display device of the present example can shift the refractive-index profile easily in the horizontal direction (the x-direction) which is a direction crossing with the stripe-shaped transparent electrodes at right angles, with keeping a certain refractive-index profile. Assuming that two sets of transparent electrodes, where each of the sets corresponds to a half pitch of liquid-crystal lens 20, are named as VL electrodes and VR electrodes, respectively, the number of the metal wires can be reduced by using common voltage settings for VL electrodes and VR electrodes of liquid-crystal lens 20.

That is, assuming that there are provided electrodes VL(1, 0), VL(1, 1), . . . and VL(1, n) corresponding to the first lens, electrodes VL(2, 0), VL(2, 1), . . . and VL(2, n) corresponding to the second lens, . . . and electrodes VL(i, 0), VL(i, 1), . . . and VL(i, n) corresponding to the i-th lens in the liquid-crystal lens 20, applied voltages of each group of VL electrodes are set to be a common value as the following expressions.

$$VL(1, 0) = VL(2, 0) = \ldots = VL(I, 0) = \ldots$$
$$VL(1, 1) = VL(2, 1) = \ldots = VL(I, 1) = \ldots$$
$$\ldots$$
$$VL(1, n) = VL(2, n) = \ldots = VL(I, n) = \ldots$$

The applied voltages of the VR electrodes are set in the same manner. Thereby, the number of output voltage values of driver 26 and the number of the metal wires can be significantly reduced in comparison with the total number of the transparent electrodes, which realizes a cost reduction and a reduction of the frame width of the display device.

Further, the stereoscopic image display device of the present example does not require to control microscopic liquid-crystal cells individually by using TFT elements as described in JP-A Nos. 2010-56712 and 2002-328333, which simplifies the manufacturing processes, avoids the reduction of the yield rate, and restricts a cost increase.

Further, if in a simple matrix structure as disclosed in JP-A No. 2002-328333 under a uniform molecular alignment states which is as simple as that used in a general liquid-crystal lens, a changed voltage is applied to each of neighboring working areas (each being equivalent to a microscopic cell), a display pixel is affected by leakage electric fields coming from neighboring display pixels on the all sides including up, down, left, right and diagonals, as an external disturbance. This situation causes a disturbance of molecular alignment of liquid crystal (disclination line) and brings a difficulty of an excellent control of the refractive-index profile. On the other hand, in the present example, molecules are oriented in the direction perpendicular to the extending direction of stripe structures of the stripe-shaped transparent electrodes, which makes the initial orientation direction of liquid crystal molecules having a positive dielectric anisotropy parallel with the direction of an electric field applied by the stripe-shaped transparent electrodes (in other words, the both directions are the same as the direction perpendicular to the extending direction of stripe structures of the stripe-shaped electrodes). Since there is caused no external disturbance caused by leakage electric fields coming from neighboring pixel areas, the disturbance of molecular alignment of liquid crystal is restricted, which allows an excellent control of the refractive-index profile.

When a lens sheet was enlarged in a conventional display device, the difference of the lens sheet and a liquid-crystal display panel in material caused the difference of them in shrinkage rate because of heat, which further caused the pitch difference of liquid-crystal pixels and lenses and lowered the quality of the stereoscopy. However, in the present example, members and a manufacturing equipment of the liquid-crystal lens, other than an exclusive mask for exposure of an electrode pattern and a liquid-crystal material which are additionally prepared, can be shared with those of the liquid-crystal display panel. Further, liquid-crystal panel 30 and liquid-crystal lens 20 are structured by the similar members. Therefore, the trend of liquid-crystal panel 30 in size change because of heat shrinkage becomes the same as that of liquid-crystal lens 20, and an enlargement of the screen hardly causes the difference in pitch between liquid-crystal panel 30 and liquid-crystal lens 20. Further, an enlargement of the lens sheet makes processing molds and dies, and the manufacturing equipment large, and significantly increases the manufacturing cost. However, liquid-crystal lens 20 is manufactured by using the same equipment with that of liquid-crystal panel 30, and what is additionally needed to be prepared for the enlargement is an exposure mask for patterning electrodes, which makes the initial cost for manufacturing the display device relatively reduced and also gives an advantage that such the manufacturing system easily addresses the production of many kinds in small quantities.

As described above, the stereoscopic image display device of the present example is configured to drive liquid-crystal display device 30 so as to display an image for the left eye and an image for the right eye, recognize the position of an observer being in front of the stereoscopic image display device by using a tracing sensor, and then control voltages for driving liquid-crystal lens 20 in the above-described manner. Such the control to apply a proper drive voltage to each of cells, which correspond to respective pixels, of liquid-crystal lens 20 allows the stereoscopic image display device to control the alignment condition of liquid crystal and to form a desired refractive-index profile.

After the shift of the observer's viewpoint position, the stereoscopic image display device is configured to electrically shift the refractive-index profile of liquid-crystal lens 20 based on a result of the tracking sensor. Thereby, the liquid-crystal lens 20 can maintain lens properties even for the moved user and can gives perceptions of an image for the left eye and an image for the right eye, which are displayed on the same screen, separately to the left eye and the right eye of the moved observer by using its image separation function. Because of the function, even after an observer's viewpoint is moved, the stereoscopic image display device does not lose the stereoscopic effect for the observer. That is, stereoscopic image display device 10 with high quality can be provided.

Example 2

Next, the structure, operations, the manufacturing method and the manufacturing procedure of a stereoscopic image display device of Example 2 will be described with referring to FIGS. 14A to 14C.

In the stereoscopic image display device of Example 1, as described above, liquid-crystal lens 20 includes stripe-shaped transparent electrodes and counter transparent electrode (COM electrode) formed on transparent substrates facing each other, where the stripe-shaped transparent electrodes are arranged on a transparent substrate at the side of liquid-crystal panel 30 and the counter transparent electrode is arranged on the other transparent substrate at the observer's side. However, in this example, as shown in FIG. 14A, the positions of the stripe-shaped transparent electrodes and counter transparent electrode are inversed such that the counter transparent electrode is arranged on the transparent substrate at the side of liquid-crystal panel 30 (the lower side of FIG. 14A). Such the structure restricts an influence of the electric field generated when liquid-crystal lens 20 is driven, to liquid-crystal display panel 30.

As described above, since the structure of the stereoscopic image display device of this example restricts noises generated in liquid-crystal display panel 30 and coming from the electric field for driving liquid-crystal lens 20, liquid-crystal display panel 30 can display proper images. In contrary, since noises coming from liquid-crystal panel 30 hardly affect liquid-crystal lens 20, too, liquid-crystal lens 20 can maintain optimum lens properties.

Example 3

Next, the structure, operations, the manufacturing method and the manufacturing procedure of a stereoscopic image display device of Example 3 will be described with referring to FIGS. 15A and 15B.

In the stereoscopic image display device of each of Examples 1 and 2, as described above, the counter transparent electrode (COM electrode) of liquid-crystal lens 20 has a solid plate structure. However, in this example, as shown in FIG. 15A, the counter transparent electrode (COM electrode) of liquid-crystal lens 20 is divided into stripe-shaped structures similarly to the stripe-shaped transparent electrodes at the VL side and VR side so as to adjust voltages of the divided structures of the counter transparent electrode separately. Thereby, the refractive-index profile of liquid-crystal lens 20 can be adjusted more precisely.

Accordingly, the above structure of the stereoscopic image display device of this example realizes liquid-crystal lens 20 which is excellent in the image-forming properties and properties of separating the right and left images.

Example 4

Next, the structure, operations, the manufacturing method and the manufacturing procedure of a stereoscopic image display device of Example 4 will be described with referring to FIGS. 16A and 16B.

In the stereoscopic image display device of Example 3, as described above, the stripe-shaped transparent electrodes and the respective stripe-shaped counter transparent electrodes (COM electrode) of liquid-crystal lens 20 are arranged to face (be superimposed) each other. On the other hand, in this example, as shown in FIG. 16A, the VL-side and VR-side stripe-shaped transparent electrodes and the respective stripe-shaped counter transparent electrodes of liquid-crystal lens 20 are arranged in an x-y plane such that the positions of the VL-side and VR-side stripe-shaped transparent electrodes are shifted from the positions of the respective stripe-shaped counter transparent electrodes by a length equivalent to the width of one of the transparent electrodes in the x-axis direction. In contrast to the electrode arrangement of Example 3, which is that the positions of the VL-side and VR-side stripe-shaped transparent electrodes agree with the positions of the respective stripe-shaped counter transparent electrodes, the arrangement of the transparent electrodes of the present example makes the positions of gaps of the transparent electrodes agree with the positions where the counter transparent electrodes exist, which reduces a deterioration of transmittance of liquid-crystal lens 20, and enhances a uniformity of the transmittance because a fluctuation of the transmittance depending on position is leveled. Further, the uniformity of the transmittance in the x-y plane reduces a moiré pattern can be generated when the VL-side and VR-side stripe-shaped transparent electrodes are superimposed on the stripe-shaped counter electrodes.

Accordingly, the above structure of the stereoscopic image display device of this example realizes liquid-crystal lens 20 with high brightness and high transmittance and achieves low power consumption of a light source of the stereoscopic image display device. Further, the stereoscopic image display device of this example can display images with a reduced moiré pattern and excellent uniformity.

Example 5

Next, the structure, operations, the manufacturing method and the manufacturing procedure of a stereoscopic image display device of Example 5 will be described with referring to FIGS. 17A and 17B.

In the stereoscopic image display devices of Examples 1 to 4, as described above, there is arranged a polarization plate at the side of liquid-crystal panel 30 in liquid-crystal lens 20. On the other hand, in the present example, there is arranged one polarization plate between liquid-crystal lens 20 and liquid-crystal panel 30, so that the one polarization plate is shared with liquid-crystal lens 20 and liquid-crystal panel 30.

Accordingly, the above structure of the stereoscopic image display device of this example reduces loss of light because of a polarization plate, which realizes stereoscopic image display device 10 with high brightness and high transmittance and achieves low power consumption of a light source of the stereoscopic image display device.

Example 6

Next, the structure, operations, the manufacturing method and the manufacturing procedure of a stereoscopic image display device of Example 6 will be described with referring to FIGS. 18 and 19.

In the stereoscopic image display device of Example 1, as described above, the metal wires are arranged outside the display area in liquid-crystal lens 20. On the other hand, in the present example, as shown in FIGS. 18 and 19, there are provided metal wires (metal lead wires) extending from positions located at intervals of the predetermined number of pixels along the vertical direction on the metal wires which are arranged outside the display area, toward the inside of the display area perpendicularly to the direction of stripe structures of the stripe-shaped transparent electrodes of liquid-crystal lens 20, where the number of the metal lead wires extending toward the inside of the display area is the same as the number of stripe-shaped transparent electrodes forming one electrode group in liquid-crystal lens 20. In this arrangement, the metal wires extending toward the inside of the display area are arranged in areas corresponding to light-shielding areas (for example, light-shielding sections on gate wires) of liquid-crystal panel 30 to be combined with liquid-crystal lens 20. The metal lead wires and the respective stripe-shaped transparent electrodes area connected through an interlayer insulating layer, so that driver 26 supplies voltages to 2n stripe-shaped transparent electrodes at the VL side and VR side. The total number of metal lead wires extending into the display area is defined according to the size of display area.

If unwanted leakage electric field coming from the metal lead wires extending into the display area affects lens properties of liquid-crystal lens inside the display area, an electric-field-shielding electrode may be arranged between those metal lead wires and the liquid crystal layer so as to be connected to the potential of counter transparent electrodes (COM potential). The way to arrange the electric-field-shielding electrode is that a shield COM wires made of the same material as that of the metal lead wires are arranged between the metal wires and pixel opening sections (areas surrounded by broken lines in FIG. 19), or that electric-field shielding electrodes are arranged between the metal lead wires and the stripe-shaped electrodes so as to cover a bundle of the metal lead wires through an interlayer insulating layer.

The transparent electrodes extending along the elongated direction of their stripe structures cause a greater voltage fall thereon at a position being more distant from their applied-voltage input terminals connected to the metal lead wires, since the transparent electrodes have a relatively high resistivity. A certain resistivity of the transparent electrodes can harm a normal drive process of the liquid-crystal lens, and its influence can increase as the interval of the input end side and the opposite end of the display area becomes greater corresponding to an enlargement of the screen. However, as described above, each stripe-shaped transparent electrode in the present example has contacts for metal lead wires arranged at necessary positions thereon, which avoids the voltage reduction. The metal lead wires of liquid-crystal lens 20 are not required to be arranged on all the light-shielding areas, for example, all the light-shielding sections on the gate wires. The metal lead wires may be arranged at arbitrary intervals depending on the situation. FIG. 19 shows the arrangement of metal wires when one lens pitch of the liquid-crystal lens is formed by 2n stripe-shaped transparent electrodes (n=5).

Accordingly, the metal lead wires are arranged in the display area in this example. Thereby, the liquid-crystal lens can be driven according to setting voltages to get desired properties within the display area, and the stereoscopic image display device of this example can obtain excellent stereoscopic imaging properties when viewpoint tracking is carried out. Further, such the arrangement of the metal lead wires can reduce the number of drivers and the number of wires, and realizes the reduced manufacturing cost of the stereoscopic image display device.

Example 7

Next, the structure, operations, the manufacturing method and the manufacturing procedure of a stereoscopic image display device of Example 7 will be described with referring to FIGS. 20A, 20B, 21 and 22.

In the stereoscopic image display device of Example 1, as described above, a common drive voltage is applied to all the stripe-shaped transparent electrodes belonging to one group in liquid-crystal lens 20, where the stripe-shaped transparent electrodes corresponds to columns of pixels of liquid-crystal display panel 30. On the other hand, in the present example, as shown in FIGS. 20A, 20B and 21, driver 26 supplies voltages separately to all the stripe-shaped transparent electrodes of liquid-crystal lens 20. Concretely, metal wires being smaller in width than the stripe-shaped transparent electrodes are arranged to extend from the input sections of the stripe-shaped transparent electrodes to the display-area ends at the opposite side of the input sections of the stripe-shaped transparent electrodes. In this structure, the thin metal wires are arranged under the transparent electrodes (between the transparent electrodes and the transparent substrate made of glass).

According to this arrangement, applied voltages of the stripe-shaped transparent electrodes can be individually set, which allows flexible adjustment of the refractive-index profile of liquid-crystal lens 20. For example, when an observer in front of a large screen moves to a deflected position on the right or left as shown in FIG. 22, liquid-crystal lens 20 can be driven such that a part of liquid-crystal lens 20, which is located closer to the observer, has the different shift amount of the refractive-index profile and the different focal length from those of another part of liquid-crystal lens 20 which is located farther from the observer.

This arrangement uses the increased number of drivers 26 and the increased number of wires in comparison with the arrangement of Example 6, but can change the shift amount of the refractive-index profile of liquid-crystal lens 20 and the focal lengths according to a position in the display area, which reduces a convergence disparity generated when the tracking of the observer's viewpoint is carried out, allow the observer to get less eyestrain, and provides the stereoscopic image display device with more-excellent stereoscopic imaging properties.

Example 8

Next, the structure, operations, the manufacturing method and the manufacturing procedure of a stereoscopic image display device of Example 8 will be described with referring to FIGS. 23 and 24.

In the stereoscopic image display devices of Examples 1 to 7, as described above, the stripe-shaped transparent electrodes and the stripe-shaped counter transparent electrodes of liquid-crystal lens 20 are formed into rectangular. In the present example, as shown in FIGS. 23 and 24, the stripe-shaped transparent electrodes and the stripe-shaped counter transparent electrodes of liquid-crystal lens 20 are formed into a shape that stripes are bent at plural positions located at uniform intervals, corresponding to columns of unit pixels of liquid-crystal panel 30, where each unit pixel is composed of a pixel for the left viewing field and a pixel for the right field. This arrangement makes the situation that the positions of edges of lens patterns or lens centers when the refractive-index profiles of liquid-crystal lens is shifted do not always agree with the positions of light-shielding areas separating pixels in liquid-crystal panel. In the liquid-crystal panel 30, unit pixels are arranged in rows such that a pixel for the right viewing field in one unit pixel neighbors to a pixel for the left viewing field in the next unit pixel, and each of the rows of unit pixels is arranged to be displaced from the next row by a constant distance. In such the arrangement of unit pixels, each column is composed of a group of corresponding unit pixels in the respective rows which are displaced by the constant from another unit pixel in the next row. Alternatively, only the stripe-shaped transparent electrodes of liquid-crystal lens 20 may be bent in the above manner.

In the present example, the stripe-shaped transparent electrodes and the stripe-shaped counter transparent electrodes are formed into a shape that stripes are bent at plural positions located at uniform intervals. Such the arrangement avoids a generation of a moiré pattern coming from the situation that the transparent electrodes are superimposed on the light-shielding areas separating pixels of liquid-crystal panel 30, and a steep brightness reduction generated when the positions of edges of lens patterns or lens centers when the refractive-index profiles of liquid-crystal lens agree with the positions of the light-shielding areas, which provides the stereoscopic image display device with more-excellent stereoscopic imaging properties.

Example 9

Next, the structure, operations, the manufacturing method and the manufacturing procedure of a stereoscopic image display device of Example 9 will be described with referring to FIGS. 25A, 25B and 26.

In the stereoscopic image display devices of Example 1 shown in FIGS. 8A and 8B and Example 7 shown in FIGS. 20A and 20B, the stripe-shaped transparent electrodes are formed on metal wires in liquid-crystal lens 20 so as to connect the metal wires and the stripe-shaped transparent electrodes together. On the other hand, the present example provides an arrangement that ends of the stripe-shaped transparent electrodes are connected to the metal wires electrically through contact holes, as shown in FIGS. 25A, 25B and 26.

When liquid-crystal lens 20 is combined with a panel having a small-sized screen, for use in a mobile device, the liquid-crystal lens 20 can be reduced in size, too. Therefore, even if the stripe-shaped transparent electrodes are made of a transparent-electrode material with relatively-high resistivity, such as ITO, in comparison with metals, the voltage reduction caused in the area from the input ends, where contact holes are formed, to the other ends of the stripe-shaped transparent electrodes becomes so small not to affect the uniformity in the panel plane of liquid-crystal lens 20.

Therefore, in such the arrangement, the metal wires are not required to be arranged directly under the stripe-shaped transparent electrodes with extending in the area from the input ends to the opposite ends of the stripe-shaped transparent electrodes. Thereby, light which should be shielded by the metal wires straightly under the stripe-shaped transparent electrodes can transmit the liquid-crystal lens 20, which increases the transmittance of the liquid-crystal lens 20 and provides the stereoscopic image display device with more-excellent stereoscopic imaging properties.

In the above examples, stereoscopic image display device 10 may use an organic-electro-luminescence display unit as the image display unit (liquid-crystal panel 30 in the above examples). While the present embodiments of the present invention have been described using specific terms, such description is for illustrative purpose only, and it is to be understood that changes and variations may be made without departing from the spirit or scope of the appended claims.

The invention claimed is:
1. A stereoscopic image display device comprising:
an image display unit including a plurality of unit pixels arranged in matrix, for forming images on a display surface thereof, each of the unit pixels including a pixel for a left viewing field and a pixel for a right viewing field;
a gradient-refractive-index liquid-crystal lens arranged at an observer's side of the display surface of the image display unit, the liquid-crystal lens including
a liquid-crystal cell including two transparent substrates facing each other, a liquid crystal layer put between the transparent substrates, and polarization elements formed on the transparent substrates, respectively, a plurality of electrode groups formed on a surface facing the liquid crystal layer of one of the transparent substrates, each of the electrode groups including a plurality of stripe-shaped transparent electrodes corresponding to a column of the unit pixels of the image display unit, and a counter transparent electrode formed on the other of the transparent substrates and having a constant potential; and a liquid-crystal lens drive circuit for driving the liquid-crystal lens, the liquid-crystal lens drive circuit being configured to apply voltages to the plurality of transparent electrodes with forming a common voltage pattern for each of the electrode groups so as to make liquid crystal of the liquid crystal layer work as a plurality of lenses forming a predetermined refractive-index profile for each of the electrode groups by driving the liquid crystal by using a voltage difference between the plurality of transparent electrodes and the counter transparent electrode, and shift the voltage pattern according to information of a viewpoint position of an observer so as to shift the refractive-index profile of each of the lenses.

2. The stereoscopic image display device of claim 1, further comprising:
a detector for detecting the viewpoint position of the observer,
wherein the liquid-crystal lens drive circuit is configured to shift the voltage pattern according to information of the viewpoint position of the observer given by the detector.

3. The stereoscopic image display device of claim 1, further comprising:
an input unit for inputting the viewpoint position of the observer,
wherein the liquid-crystal lens drive circuit is configured to shift the voltage pattern according to information of the viewpoint position of the observer given by the input unit.

4. The stereoscopic image display device of claim 1,
wherein the liquid-crystal lens drive circuit is configured to
receive information of the viewpoint position of the observer, the information being inputted electrically from outside of the stereoscopic image display device and
shift the voltage pattern according to the information of the viewpoint position of the observer inputted electrically.

5. The stereoscopic image display device of claim 1,
wherein the liquid-crystal lens drive circuit is configured to adjust focal lengths of the plurality of lenses based on a maximum voltage value of the voltage pattern.

6. The stereoscopic image display device of claim 1,
wherein the counter transparent electrode has a solid shape.

7. The stereoscopic image display device of claim 6,
wherein the one of the transparent substrates on which the transparent electrodes are arranged is located farther from the image display unit than the other of the transparent substrates, and
the other of the transparent substrates on which the counter transparent electrode is arranged is located closer to the image display unit than the one of the transparent substrates.

8. The stereoscopic image display device of claim 1,
wherein the counter transparent electrode has a shape of stripes.

9. The stereoscopic image display device of claim 8,
wherein the transparent electrodes and the counter transparent electrode are arranged such that stripe structures of the transparent electrodes are superimposed on stripe structures of the counter transparent electrode when viewed from a normal direction of the transparent substrates.

10. The stereoscopic image display device of claim 8,
wherein the transparent electrodes and the counter transparent electrode are arranged such that stripe structures of the transparent electrodes are shifted not to be superimposed on stripe structures of the counter transparent electrode when viewed from a normal direction of the transparent substrates.

11. The stereoscopic image display device of claim 1, further comprising
a plurality of metal wires, a number of the metal wires being a same as a number of the transparent electrodes forming one of the electrode groups, the metal wires extending perpendicularly to an extending direction of stripe structures of the transparent electrodes, and
a interlayer insulating layer formed between the metal wires and the transparent electrodes,
wherein transparent electrodes arranged at a same position in the respective electrode groups are connected to one of the metal wires through the interlayer insulating layer.

12. The stereoscopic image display device of claim 11, further comprising
a plurality of lead wires being connected to the metal wires and extending in the extending direction of the stripe structures of the transparent electrodes, the lead wires being formed directly below the respective transparent electrodes.

13. The stereoscopic image display device of claim 12,
wherein the lead wires extend over a full length of the stripe structures of transparent electrodes.

14. The stereoscopic image display device of claim 12,
wherein the lead wires are smaller in width than the stripe structures of the transparent electrodes.

15. The stereoscopic image display device of claim 1,
wherein the transparent electrodes or both of the transparent electrodes and the counter transparent electrode are bent at a plurality of positions at constant intervals.

16. The stereoscopic image display device of claim 1, comprising one polarization plate arranged at a position between the liquid-crystal lens and the image display unit,
wherein the one polarization plate serves as both of a polarization element for use in the image display unit and one of the polarization elements for use in the liquid-crystal lens.

17. The stereoscopic image display device of claim 1,
wherein the image display unit is a liquid-crystal display unit.

18. The stereoscopic image display device of claim 1,
wherein the image display unit is an organic electro-luminescence display unit.

* * * * *